US012446068B2

(12) United States Patent
Chien

(10) Patent No.: US 12,446,068 B2
(45) Date of Patent: Oct. 14, 2025

(54) CHANNEL ACCESS METHOD, USER EQUIPMENT, AND BASE STATION

(71) Applicant: Purplevine Innovation Company Limited, Hong Kong (CN)

(72) Inventor: Chun-Che Chien, Hong Kong (CN)

(73) Assignee: Purplevine Innovation Company Limited, Hong Kong (CN)

( * ) Notice: Subject to any disclaimer, the term of this patent is extended or adjusted under 35 U.S.C. 154(b) by 400 days.

(21) Appl. No.: 17/915,504

(22) PCT Filed: Dec. 21, 2021

(86) PCT No.: PCT/CN2021/140165
§ 371 (c)(1),
(2) Date: Sep. 29, 2022

(87) PCT Pub. No.: WO2022/135415
PCT Pub. Date: Jun. 30, 2022

(65) Prior Publication Data
US 2023/0146487 A1 May 11, 2023

Related U.S. Application Data

(60) Provisional application No. 63/128,500, filed on Dec. 21, 2020.

(51) Int. Cl.
*H04W 4/00* (2018.01)
*H04W 72/23* (2023.01)
(Continued)

(52) U.S. Cl.
CPC ....... *H04W 74/0808* (2013.01); *H04W 72/23* (2023.01); *H04W 72/232* (2023.01); *H04W 74/006* (2013.01); *H04W 74/085* (2013.01)

(58) Field of Classification Search
CPC ............. H04W 74/0808; H04W 72/23; H04W 72/232; H04W 74/006; H04W 74/085
(Continued)

(56) References Cited

U.S. PATENT DOCUMENTS

2020/0322988 A1   10/2020   Fisher-Jeffes et al.
2020/0396767 A1*  12/2020   Talarico ............ H04W 74/0808
(Continued)

FOREIGN PATENT DOCUMENTS

CN      111601392      8/2020
CN      111800887      10/2020

OTHER PUBLICATIONS

International Search Report and the Written Opinion Dated Mar. 1, 2022 From the International Searching Authority Re. Application No. PCT/CN2021/140165. (7 Pages).
(Continued)

*Primary Examiner* — Chuong T Ho

(57) ABSTRACT

A user equipment (UE) executes a semi-static channel access method during a random access procedure in an unlicensed band. A base station transmits configuration information and downlink (DL) information to the UE in a fixed frame period (FFP) according to a set of FFP parameters associated with the base station. The UE determines whether to initiate a channel occupancy time (COT) in an FFP according to a set of FFP parameters associated with the UE based on one or more of: at least one condition in the configuration information, at least one condition in scheduling information, at least one condition in DL information, and a detection result of detecting transmission of the DL information. The base station determines whether to use the UE-initiated COT shared from the UE.

55 Claims, 13 Drawing Sheets

(51) Int. Cl.
*H04W 72/232* (2023.01)
*H04W 74/00* (2009.01)
*H04W 74/0808* (2024.01)
*H04W 74/0833* (2024.01)

(58) Field of Classification Search
USPC .................................................. 370/329, 330
See application file for complete search history.

(56) References Cited

U.S. PATENT DOCUMENTS

| | | |
|---|---|---|
| 2021/0385863 A1 | 12/2021 | Fan et al. |
| 2022/0159723 A1 | 5/2022 | Jiang |
| 2022/0248466 A1* | 8/2022 | Fan ...................... H04W 72/54 |
| 2023/0029903 A1* | 2/2023 | Singh ................ H04W 72/1268 |
| 2023/0180293 A1* | 6/2023 | Calcev .................. H04W 16/14 |
| | | 370/328 |
| 2023/0319885 A1* | 10/2023 | Bagheri ................ H04L 1/1819 |
| | | 370/329 |
| 2023/0413320 A1* | 12/2023 | Singh ................ H04W 74/0875 |

OTHER PUBLICATIONS

Spreadtrum Communications, "Discussion on Enhancements for Unlicensed Band URLLCIIoT", Spreadtrum Communications, 3GPP TSG RAN WG1 Meeting #103-e, E-Meeting, Oct. 26-Nov. 13, 2020, R1-2008108, 5 P., Nov. 13, 2020.

* cited by examiner

CHANNEL ACCESS METHOD, USER EQUIPMENT, AND BASE STATION

RELATED APPLICATIONS

This application is a National Phase of PCT Patent Application No. PCT/CN2021/140165 having International filing date of Dec. 21, 2021, which claims the benefit of priority under 35 USC § 119 (e) of U.S. Provisional Patent Application No. 63/128,500 filed on Dec. 21, 2020. The contents of the above applications are all incorporated by reference as if fully set forth herein in their entirety.

FIELD AND BACKGROUND OF THE INVENTION

The present disclosure relates to the field of communication systems, and more particularly, to a channel access method, a user equipment, and a base station.

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards being a broadband and mobile system. In cellular wireless communication systems, user equipment (UE) is connected by a wireless link to a radio access network (RAN). The RAN comprises a set of base stations (BSs) that provide wireless links to the UEs located in cells covered by the base station, and an interface to a core network (CN) which provides overall network control. As will be appreciated the RAN and CN each conduct respective functions in relation to the overall network. The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB.

Even though a UE can transmit anywhere within the remaining portion of a gNB-initiated COT. It poses restrictions to the UE that all the UL transmissions will depend on the LBT results of the gNB and the detection of the possible DL transmissions in an FFP of the gNB-initiated COT. URLLC operation only supporting gNB-initiated COT is not efficient and possibly induces the latency for UL transmissions, especially for configured grant UL transmissions. In gNB-initiated COT, the UE has to confirm that the gNB have successfully acquired the COT at the front portion of the FFP of the gNB-initiated COT such that UE can transmit UL data or signals. For example, the UE can transmit CG-PUSCH only if the UE has successfully decoded a PDCCH from the gNB, which introduces additional latency caused by gNB DL transmission time and UE processing time. The URLLC operations using gNB-initiated COT restricts URLLC's flexibility of the UL scheduling at the initial part of the FFP.

In gNB-initiated COT, in order to trigger UL transmission, the gNB needs to retain acquired COT and transmit DL signal or DL channel at the front portion of the FFP, even if the gNB has no downlink traffic to transmit, and even if gNB does not know whether the UE intends to transmit uplink transmission or not in the configured grant (CG) case.

NR-U support multiple transport blocks (TBs) transmission and CG-UCI. CG-UCI is uplink control information transmitted in CG-PUSCH and is define in TS 38.212. However, NR-U does not support the feature of segmentation of a repetition in URLLC, i.e., no support of cross-slot resource allocation. If a repetition collides with one or more invalid symbol(s), the repetition is dropped. A method to harmonize UL configured-grant enhancements in NR-U and URLLC introduced in Rel-16 is desirable to be applicable for unlicensed spectrum.

SUMMARY OF THE INVENTION

An object of the present disclosure is to propose a user equipment, a base station, and channel access method. In a first aspect, an embodiment of the invention provides a channel access method executable in a user equipment (UE), comprising:

receiving configuration information and scheduling information from a base station;

detecting transmission of downlink (DL) information in a fixed frame period (FFP) according to a set of FFP parameters associated with the base station;

determining whether to initiate a channel occupancy time (COT) in an FFP according to a set of FFP parameters associated with the UE based on at least one condition in the configuration information, at least one condition in the scheduling information, and a detection result of detecting the transmission the DL information;

initiating the COT in the FFP according to the set of FFP parameters associated with the UE after a successful listen-before-talk (LBT) upon affirming the determining as to whether to initiate the COT;

transmitting a UL burst in one or more symbols that are valid in a region of the FFP according to the set of FFP parameters associated with the UE; and receiving a DL burst from the base station in one or more symbols are valid in the region of the FFP according to the set of FFP parameters associated with the UE when the UE shares with the base station the COT initiated by the UE.

In a second aspect, an embodiment of the invention provides a channel access method executable in a base station, comprising:

transmitting configuration information and scheduling information;

transmitting downlink (DL) information in a fixed frame period (FFP) according to a set of FFP parameters associated with the base station;

receiving an uplink (UL) burst in one or more symbols that are valid in a region of a fixed frame period (FFP) according to a set of FFP parameters associated with a user equipment (UE); and transmitting a DL burst in one or more symbols that are valid in the region of the FFP according to the set of FFP parameters associated with the UE when the base station uses a channel occupation time (COT) initiated by the UE. In a third aspect, an embodiment of the invention provides a user equipment (UE) comprising a processor configured to call and run a computer program stored in a memory, to cause a device in which the processor is installed to execute the disclosed method.

In an fourth aspect, an embodiment of the invention provides a base station comprising a processor configured to call and run a computer program stored in a memory, to cause a device in which the processor is installed to execute the disclosed method.

The disclosed method may be programmed as computer executable instructions stored in non-transitory computer readable medium. The non-transitory computer readable medium, when loaded to a computer, directs a processor of the computer to execute the disclosed method.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

The disclosed method may be programmed as a computer program product, that causes a computer to execute the disclosed method.

The disclosed method may be programmed as a computer program, that causes a computer to execute the disclosed method.

Some embodiments of disclosure can be applied to URLLC and Industry IoT to address issues in unlicensed band. FBE supporting UE-initiated COT is crucial to improve uplink reliability and reduce latency for IIOT/URLLC applications, power consumption, and unnecessary overhead for both the UE and the gNB. Some embodiments of the disclosure provide supports for UE-initiated COT(s). UE-initiated COT for FBE allows a UE to transmit at the earliest time in an FFP without detecting DL channels/signals from a gNB.

If both gNB-initiated COT and UE-initiated COT are activated, the UE can have more UL transmission flexibility and opportunities in a COT of either gNB-initiated FFP or UE-initiated FFP.

For various channel conditions, some embodiments of the disclosure provide supports for configurable harmonization of features and advantages between NR-U CG and URLLC CG. By harmonizing the features of NR-U and URLLC, a UE and a base station, according to some embodiments of the disclosure, can realize latency reduction and reliability enhancement for CG-PUSCH transmission in an unlicensed spectrum.

BRIEF DESCRIPTION OF THE SEVERAL VIEWS OF THE DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field may obtain other figures according to these figures without paying the premise.

DESCRIPTION OF SPECIFIC EMBODIMENTS OF THE INVENTION

Embodiments of the disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
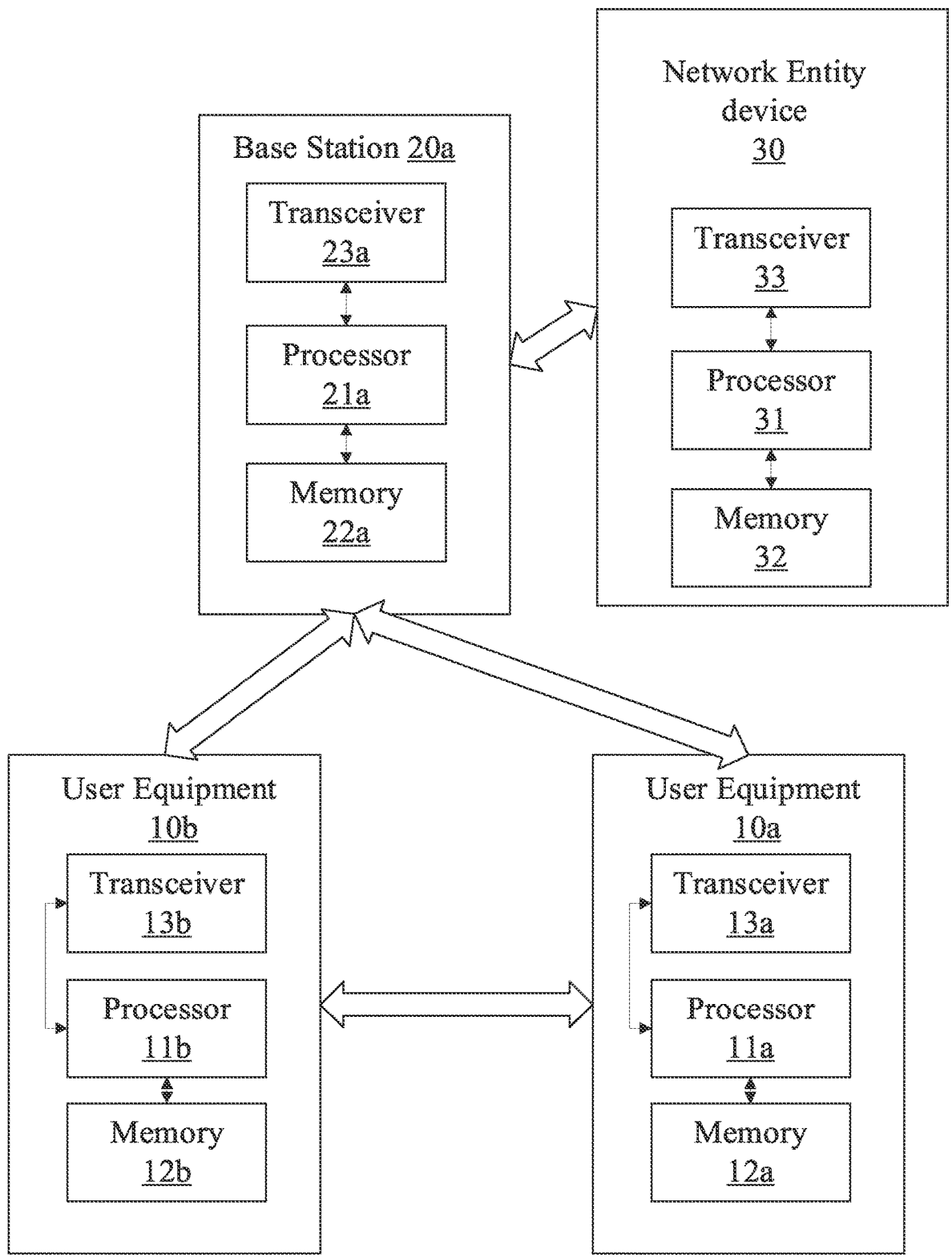
FIG. 1 illustrates a schematic view of a telecommunication system.

With reference to FIG. 1, a telecommunication system including a UE 10*a*, a UE 10*b*, a base station (BS) 20*a*, and a network entity device 30 executes the disclosed method according to an embodiment of the present disclosure. FIG. 1 is shown for illustrative not limiting, and the system may comprise more UEs, BSs, and CN entities. Connections between devices and device components are shown as lines and arrows in the FIGs. The UE 10*a* may include a processor 11*a*, a memory 12*a*, and a transceiver 13*a*. The UE 10*b* may include a processor 11*b*, a memory 12*b*, and a transceiver 13*b*. The base station 20*a* may include a processor 21*a*, a memory 22*a*, and a transceiver 23*a*. The network entity device 30 may include a processor 31, a memory 32, and a transceiver 33. Each of the processors 11*a*, 11*b*, 21*a*, and 31 may be configured to implement proposed functions, procedures and/or methods described in the description. Layers of radio interface protocol may be implemented in the processors 11*a*, 11*b*, 21*a*, and 31. Each of the memory 12*a*, 12*b*, 22*a*, and 32 operatively stores a variety of programs and information to operate a connected processor. Each of the transceivers 13*a*, 13*b*, 23*a*, and 33 is operatively coupled with a connected processor, transmits and/or receives radio signals or wireline signals. The UE 10*a* may be in communication with the UE 10*b* or other UEs. The base station 20*a* may be an eNB, a gNB, or one of other types of radio nodes, and may configure radio resources for the UE 10*a* and UE 10*b*.

Each of the processors 11*a*, 11*b*, 21*a*, and 31 may include an application-specific integrated circuit (ASICs), other chipsets, logic circuits and/or data processing devices. Each of the memory 12a, 12b, 22a, and 32 may include read-only memory (ROM), a random access memory (RAM), a flash memory, a memory card, a storage medium and/or other storage devices. Each of the transceivers 13a, 13b, 23a, and 33 may include baseband circuitry and radio frequency (RF) circuitry to process radio frequency signals. When the embodiments are implemented in software, the techniques described herein may be implemented with modules, procedures, functions, entities, and so on, that perform the functions described herein. The modules may be stored in a memory and executed by the processors. The memory may be implemented within a processor or external to the processor, in which those may be communicatively coupled to the processor via various means are known in the art.

The network entity device 30 may be a node in a CN. CN may include LTE CN or 5G core (5GC) which includes user plane function (UPF), session management function (SMF), mobility management function (AMF), unified data management (UDM), policy control function (PCF), control plane (CP)/user plane (UP) separation (CUPS), authentication server (AUSF), network slice selection function (NSSF), and the network exposure function (NEF).

Figure 2A:
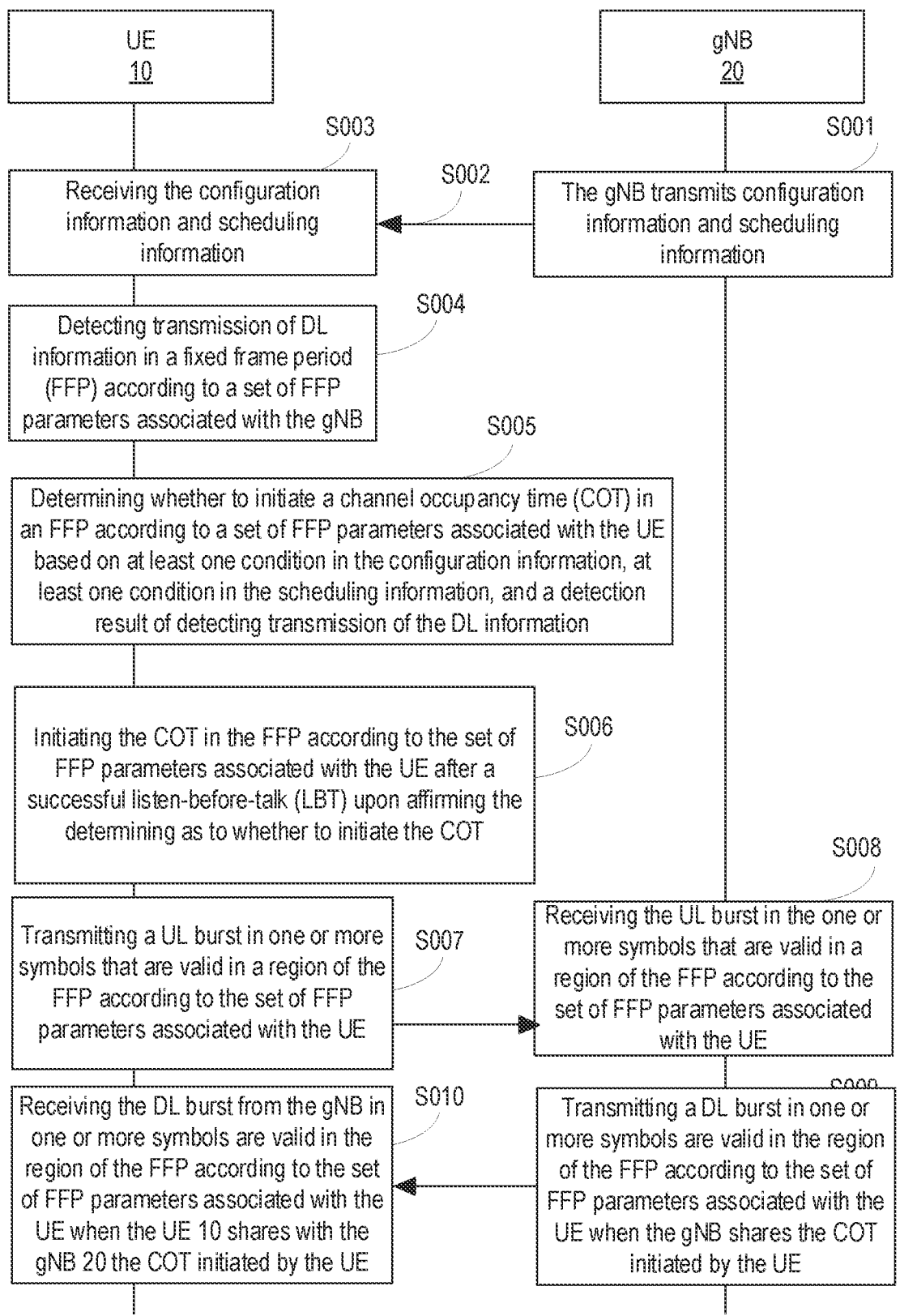
FIG. 2A illustrates a schematic view showing an embodiment of a semi-static channel access method in unlicensed band.
Figure 2B:
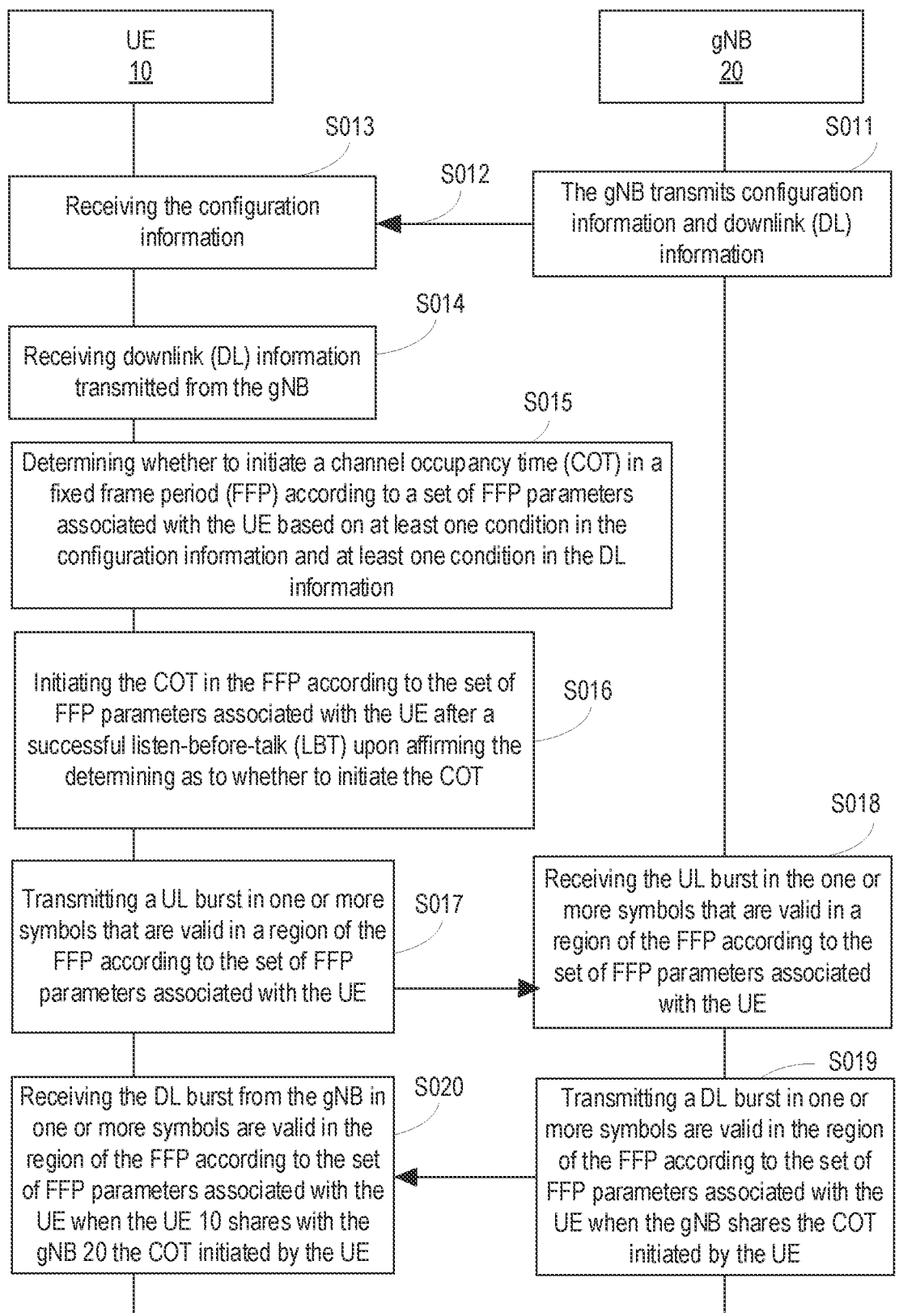
FIG. 2B illustrates a schematic view showing another embodiment of a semi-static channel access method in unlicensed band.
Figure 2C:
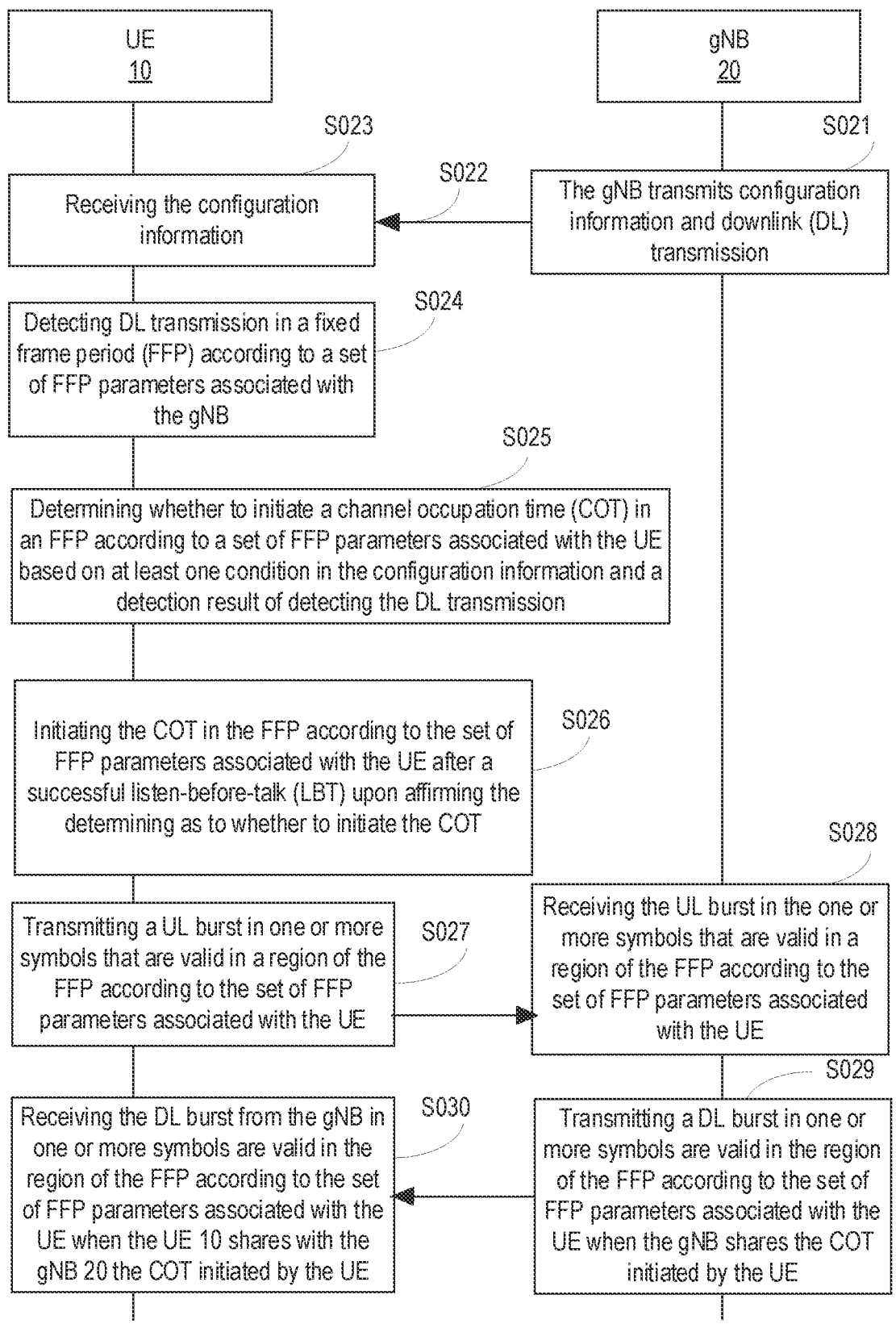
FIG. 2C illustrates a schematic view showing still another embodiment of a semi-static channel access method in unlicensed band.

An example of the UE in the description may include one of the UE 10a or UE 10b. An example of the base station in the description may include the base station 20a. With reference to FIG. 2A to FIG. 2C, for example, an embodiment of a UE 10 includes one of the UE 10a or UE 10b, an embodiment of a gNB 20 includes the base station 20a. Although the UE 10 and the gNB 20 is detailed as an example in the description, the disclosed method may be applied to other UEs and/or other base stations. Uplink (UL) transmission of a control signal or data may be a transmission operation from a UE to a base station. Downlink (DL) transmission of a control signal or data may be a transmission operation from a base station to a UE.

In the FIG. 2A, the UE 10 and the gNB 20 execute an embodiment of a semi-static channel access method in an unlicensed band. The embodiment is suitable for CG UL transmission in unlicensed band(s). The gNB 20 determines (S001) and transmits (S002) configuration information and scheduling information to the one or more UE (e.g., the UE 10). The UE 10 receives the configuration information and scheduling information from the gNB 20 (S003) and detects transmission of downlink (DL) information in a fixed frame period (FFP) according to a set of FFP parameters associated with the gNB 20 (S004).

The UE 10 determines whether to initiate a channel occupancy time (COT) in an FFP according to a set of FFP parameters associated with the UE 10 based on at least one condition in the configuration information, at least one condition in the scheduling information, and a detection result of detecting transmission of the DL information (S005).

The UE 10 initiates the COT in the FFP according to the set of FFP parameters associated with the UE 10 after a successful listen-before-talk (LBT) upon affirming the determining as to whether to initiate the COT (S006).

The UE 10 transmits to the gNB 20 a UL burst in one or more symbols that are valid in a region of the FFP according to the set of FFP parameters associated with the UE 10 (S007). The gNB 20 receives the UL burst in the one or more symbols that are valid in a region of the FFP according to the set of FFP parameters associated with the UE 10 (S008). The UL burst may comprise transmission of physical uplink shared channel (PUSCH), physical uplink control channel (PUCCH), or repetitive transmission of the PUSCH or the PUCCH. The repetitive transmission of the PUSCH may comprise repetitions of the PUSCH in PUSCH repetition type A or type B.

The gNB 20 transmits to the UE 10 a DL burst in one or more symbols are valid in the region of the FFP according to the set of FFP parameters associated with the UE 10 when the gNB 20 shares the COT initiated by the UE 10 (S009). The UE 10 receives the DL burst from the gNB 20 in one or more symbols are valid in the region of the FFP according to the set of FFP parameters associated with the UE 10 when the UE 10 shares with the gNB 20 the COT initiated by the UE 10 (S010). For example, the DL burst may include Msg2, Msg4 or PDCCH for Msg3 retransmission.

In the FIG. 2B, the UE 10 and the gNB 20 execute an embodiment of a semi-static channel access method in unlicensed band. The embodiment is suitable for DG UL transmission in unlicensed band(s). The gNB 20 generates (S011) and transmits (S012) configuration information to the one or more UE (e.g., the UE 10) and transmits downlink (DL) information to the UE 10 (S012). The UE 10 receives the configuration information transmitted from a gNB 20 (S013) and receives the DL information transmitted from the gNB 20 (S014).

The UE 10 determines whether to initiate a channel occupancy time (COT) in a fixed frame period (FFP) according to a set of FFP parameters associated with the UE 10 based on at least one condition in the configuration information and at least one condition in the DL information (S015). The UE 10 initiates a COT in the FFP according to the set of FFP parameters associated with the UE 10 after a successful listen-before-talk (LBT) upon affirming the determining as to whether to initiate the COT (S016).

The UE 10 transmits to the gNB 20 an UL burst to the gNB 20 in one or more symbols that are valid in a region of the FFP according to the set of FFP parameters associated with the UE 10 (S017). The gNB 20 receives the UL burst in the one or more symbols that are valid in a region of the FFP according to the set of FFP parameters associated with the UE 10 (S018). The UL burst may comprise transmission of physical uplink shared channel (PUSCH), physical uplink control channel (PUCCH) or repetitive transmission of the PUSCH or the PUCCH. The repetitive transmission of the PUSCH may comprise repetitions of the PUSCH in PUSCH repetition type A or type B.

The gNB 20 transmits to the UE 10 a DL burst in one or more symbols are valid in the region of the FFP according to the set of FFP parameters associated with the UE 10 when the gNB 20 shares the COT initiated by the UE 10 (S019). The UE 10 receives a DL burst from the gNB 20 in one or more symbols that are valid in the region of the FFP according to the set of FFP parameters associated with the UE 10 when the UE 10 shares with the gNB 20 the COT initiated by the UE 10 (S020). For example, the DL burst may include Msg2, Msg4 or PDCCH for Msg3 retransmission.

In the FIG. 2C, the UE 10 and the gNB 20 execute an embodiment of a semi-static channel access method in an unlicensed band. The gNB 20 generates (S021) and transmits (S022) configuration information to the one or more UE (e.g., the UE 10) and transmits downlink (DL) information to the UE 10 (S022). The UE 10 receives the configuration information transmitted from a gNB 20 (S023) and detects a downlink (DL) transmission in a fixed frame period (FFP) according to a set of FFP parameters associated with the gNB 20 (S024).

The UE 10 determines whether to initiate a channel occupation time (COT) in an FFP according to a set of FFP parameters associated with the UE 10 based on at least one condition in the configuration information and a detection result of detecting the DL transmission (S025).

The UE 10 initiates a COT in the FFP according to the set of FFP parameters associated with the UE 10 after a successful listen-before-talk (LBT) upon affirming the determining as to whether to initiate the COT (S026). The UE 10 transmits to the gNB 20 an uplink (UL) burst in one or more symbols that are valid in a region of the FFP according to the set of FFP parameters associated with the UE 10 (S027). The gNB 20 receives the UL burst in the one or more symbols that are valid in a region of the FFP according to the set of FFP parameters associated with the UE 10 (S028). The UL burst may comprise transmission of physical uplink shared channel (PUSCH), physical uplink control channel (PUCCH), or repetitive transmission of the PUSCH or the PUCCH. The repetitive transmission of the PUSCH may comprise repetitions of the PUSCH in PUSCH repetition type A or type B.

The gNB 20 transmits to the UE 10 a DL burst in one or more symbols are valid in the region of the FFP according to the set of FFP parameters associated with the UE 10 when the gNB 20 shares the COT initiated by the UE 10 (S029). The UE 10 receives a DL burst from the gNB 20 in one or more symbols that are valid in the region of the FFP according to the set of FFP parameters associated with the UE 10 when UE 10 shares with the gNB 20 the COT initiated by the UE 10 (S030). For example, the DL burst may include Msg2, Msg4 or PDCCH for Msg3 retransmission.

An embodiment of this disclosure provides schemes and corresponding procedures to address the technical issues for supporting UE-initiated channel occupation time (COT) for frame-based equipment (FBE)

UE-Initiated COT for FBE:

In controlled environments for URLLC in unlicensed band, inter-RAT interference is not expected to happen, the major challenge for URLLC is unpredictable latency due to sparse channel unavailability during the channel access. In Rel-16 NR-U, two channel access modes are supported. The first channel access mode is load-based equipment (LBE), and the second channel access mode is frame-based equipment (FBE). FBE is also known as semi-static channel access mode. Unlike LBE mode, a frame period of FBE is fixed by configuration and known as a fixed frame period (FFP). The FFP is restricted to be a value of 1 ms, 2 ms, 2.5 ms, 4 ms, 5 ms, or 10 ms. In FBE, the channel access is based on a frame structure of FFP. FFP occurs periodically and includes a channel occupation time (COT) starting from the beginning of the FFP. The COT is followed by an idle period at the end of the FFP.

Figure 3:
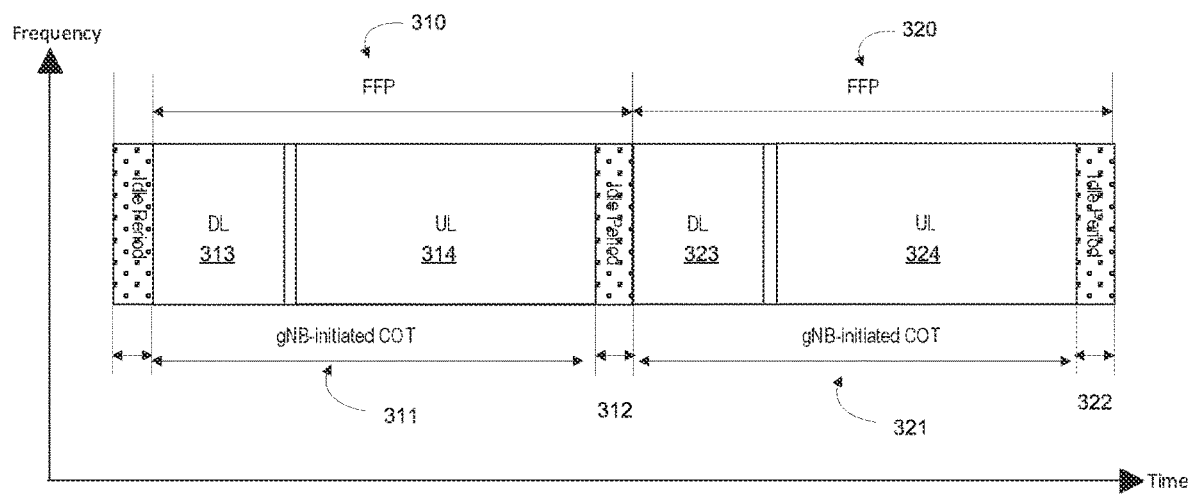
FIG. 3 illustrates a schematic view showing examples of a COT initiated by a base station (i.e., gNB-initiated COT) for FBE.

FIG. 3 shows examples of a COT initiated by a base station, such as a gNB. For simplicity, a COT initiated by a base station is referred to as a gNB-initiated COT, a BS-initiated COT, or a gNB's COT. A COT initiated by a UE is referred to as a UE-initiated COT or a UE's COT. In the description, unless being specifically pointed out, a gNB-initiated COT may be a COT initiated by a base station, such as gNB 20, according to an embodiment of the disclosure; a UE-initiated COT may be a COT initiated by a UE, such as the UE 10, according to an embodiment of the disclosure; a gNB's FFP is an FFP according to a set of FFP parameters associated with a base station, such as the gNB 220, according to an embodiment of the disclosure; and a UE's FFP is an FFP according to a set of FFP parameters associated with a UE, such as the UE 10, according to an embodiment of the disclosure. A scheme of initiating a COT by a base station is referred to as a gNB-initiated COT scheme or gNB-initiated COT function, and a scheme of initiating a COT by a UE is referred to as a UE-initiated COT scheme or UE-initiated COT function. For simplicity, the scheme of gNB-initiated COT may be referred to as gNB-initiated COT, and the scheme of UE-initiated COT may be referred to as UE-initiated COT. In the example of FIG. 3, only a gNB, such as the gNB 20, can act as an initiating device that initiates a COT, and the UE 10 acts as a responding device. Only DL transmission at the beginning of an FFP is allowed while no DL or UL transmission is allowed during the idle period. With reference to FIG. 3, an FFP 310 comprises a gNB-initiated COT 311 and an idle period 312, and an FFP 320 comprises a gNB-initiated COT 321 and an idle period 322. The UE 10 may receive DL transmission from the gNB 20 in a front portion 313 of the gNB-initiated COT 311 and in a front portion 323 of the gNB-initiated COT 321. The UE 10 may perform UL transmission to the gNB 20 in a remaining portion 314 of the gNB-initiated COT 311 and in a remaining portion 324 of the UE-initiated COT 321. A front portion is an initial part of a COT in time. One-shot listen before talk (LBT) with nine microseconds sensing slot duration as specified in technical specification (TS) 37.213 can be performed in each idle period by the gNB, such as the gNB 20. If the LBT is successful, the gNB can occupy a COT of the next FFP, a UE, such as the UE 10, can share resources within an FFP if the UE detects DL signals/channels at the beginning of the FFP. The gNB and UE can resume transmission at any location within a COT of the FFP. If a transmission gap between two transmissions is within 16 microseconds (us), no LBT is needed. An FBE mode indicator and FFP configuration are carried in the remaining minimum system information (RMSI) (e.g., system information block one, SIB1). An FFP can also be signaled via UE-specific radio resource control (RRC) signaling.

Even though a UE, such as the UE 10, can transmit UL data or signals anywhere within a remaining portion of the COT by sharing the gNB-initiated COT, the example poses restrictions to the UE that all the UL transmissions depend on the LBT results of the gNB and detection of possible DL transmissions at the beginning of an FFP. A URLLC operation only supporting gNB-initiated COT is not efficient and may induce more latency for UL transmissions, especially for configured grant UL transmissions. In the example of gNB-initiated COT, a UE, such as the UE 10, has to confirm that the gNB has successfully acquired the COT at the beginning of an FFP such that UE can transmit UL data or signals in the gNB-initiated COT. For example, a UE can transmit configured grant physical uplink shared channels (CG-PUSCHs) only if the UE has successfully decoded a PDCCH, which introduces additional latency caused by gNB DL transmission time and UE processing time. Restrictions induced by gNB-initiated COT may limit URLLC's flexibility and hinder the UE in UL scheduling at an initial portion of an FFP.

Figure 4:
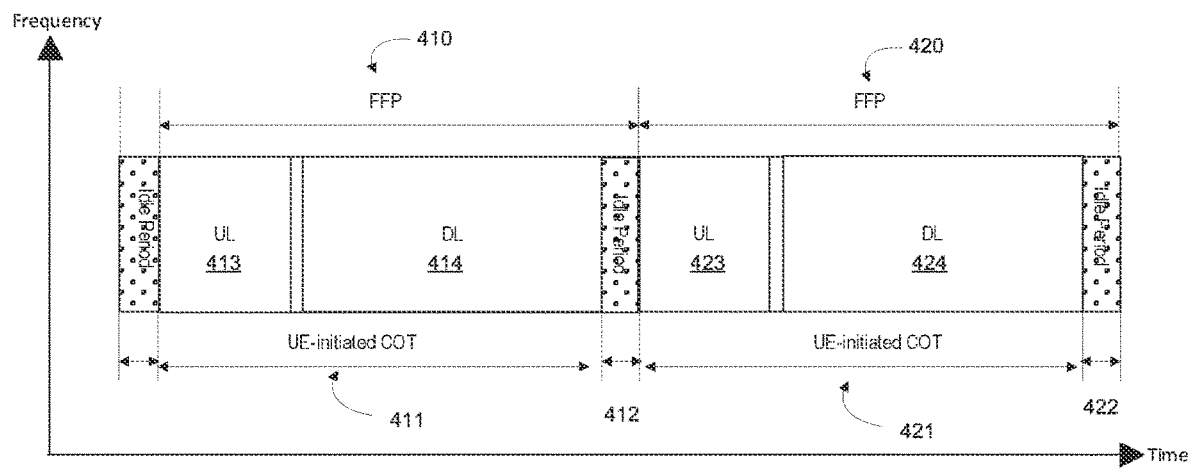
FIG. 4 illustrates a schematic view showing examples of a COT initiated by a UE (i.e., UE-initiated COT) for FBE.

Alternatively, using UE-initiated COT for FBE allows a UE, such as the UE 10, to transmit at the earliest time in an FFP without detecting DL signal(s) from the gNB. With reference to FIG. 4, an FFP 410 comprises a UE-initiated COT 411 and an idle period 412, and an FFP 420 comprises a UE-initiated COT 421 and an idle period 422. The UE 10 may perform UL transmission to the gNB 20 in a front portion 413 of the UE-initiated COT 411 and in a front portion 423 of the UE-initiated COT 421. The UE 10 may receive DL transmission from the gNB 20 in a remaining portion 414 of the UE-initiated COT 411 and in a remaining portion 424 of the UE-initiated COT 421. With UE-initiated COT, uplink channel(s) can be transmitted at the beginning (e.g., the front portion 413 or front portion 423) of each FFP (e.g., the FFP 310 or 320) associated to the UE without waiting for gNB-initiated COT to share UL resources.

In gNB-initiated COT, to trigger UL transmission, gNB needs to retain acquired COT and transmit DL signal or DL channel at the front portion of FFP, even if gNB has no downlink traffic to transmit, and even if gNB does not know whether the UE intends to transmit or not in the configured grant (CG) case. Using UE-initiated COT can reduce unnecessary DL signaling overhead and is more power-efficient from gNB's perspective. For CG UL transmissions, no explicit dynamic signaling is available, and the UE needs to implicitly determine whether a COT in the FFP is initiated by detecting DL transmission in the FFP, which results in excessive complexity and power consumption from UE's perspective.

The UE 10 using UE-initiated COT does not need to consider the possibility of LBT failure at the gNB 20 and DL signal detection failure at the UE 10. The LBT failure or the DL signal detection failure may be caused by channel overloading and worse channel condition at the gNB 20 or the UE 10. These two effects are responsible for UL transmission reliability of URLLC. If the gNB 20 cannot acquire the channel, both the gNB 20 and the UE 10 will have to abandon transmission within the FFP. If the UE 10 cannot detect the DL signal in the FFP from the gNB 20, the UE 10 will lose UL transmission opportunity. Both of the cases produce additional latency for UL transmission. If both gNB-initiated COT and UE-initiated COT are activated, the UE 10 can have more UL transmission flexibility and opportunities, either by utilizing shared COT from gNB-initiated FFP or UE-initiated FFP.

Therefore, the FBE's support for UE-initiated COT is critical to improve the reliability of the FBE's uplink transmission and reduce latency for IIOT/URLLC applications, power consumption, and unnecessary overhead for both UE and gNB.

In the disclosure, some embodiments provide supports for UE-initiated COT when one or more UEs operates as a FBE under an unlicensed spectrum.

UL Configured-Grant Enhancement in an Unlicensed Band:

In Rel-16 eURLLC, to support latency reduction, multiple CG configurations can be activated individually and released separately or released jointly. Two types of PUSCH repetitions are defined for both applicable to dynamic grant (DG) and configured grant (CG). One of multiple repetitions is a redundancy version (RV) of a PUSCH transmission. Multiple repetitions of a PUSCH realize repetitive transmission of the PUSCH. In PUSCH repetition Type A, slot level repetition using the same start and length indicator (SLIV) across K consecutive slots was defined. In PUSCH repetition Type B, intra inter-slot and inter-slot repetitions crossing slots were introduced, including segmentation schemes crossing slot boundaries or one or more invalid symbols, dynamically indication of a number of repetitions, and PUSCH frequency hopping over nominal repetitions etc. In addition, a new time domain resource assignment (TDRA) table was introduced for indicating SLIV and a number of back-to back repetitions.

To ensure high reliability of repetitive transmission, a feature of starting transmission from any redundancy version with occasion "0" in RV sequence {0, 0, 0, 0} or {0, 3, 0, 3} is also introduced. Re-transmissions are based on UL grant(s), and a configured grant timer configuredGrantTimer is introduced for autonomous new transmission indication, i.e., implicit ACK, if the timer is expired.

Rel-16 NR-U supports multiple CG configurations. To avoid the necessity of LBT for non-continuous transmission, NR-U supports more transmission opportunities for CG-PUSCH by introducing a number of consecutive slots, i.e., cg-nrofSlots, in a configured grant periodicity following a configured grant offset as well as a number of consecutive PUSCH occasions within a slot, i.e., cg-nrofPUSCH-InSlot. For example, the UE 10 repeats a transport block (TB) in a number repK of the earliest consecutive transmission occasion candidates within the same configuration. However, allocating radio resources for one nominal repetition crossing multiple slots is not allowed, and one repetition is dropped if the repetition collides with one or more invalid symbols. To decouple linkage between a hybrid automatic repeat request (HARQ) identifier (ID) and a symbol index of transmission occasion for latency reduction, NR-U supports flexible HARQ ID selection by a UE (e.g., the UE 10), and the UE has full flexibility to choose any RV for each repetition. To indicate HARQ related information to a gNB (e.g., the gNB 20), the UE transmits configured grant uplink control information (CG-UCI) carrying an HARQ ID, RV, and a new data indicator (NDI) in every CG-PUSCH. Thus, the UE has more freedom to choose a collision-free occasion for CG-PUSCH transmission with a HARQ ID available for configured grant configuration. Additionally, considering potential miss-detection of PUSCH caused by a so-called hidden node problem in an unlicensed band, NR-U introduces a configured grant retransmission timer cg-RetransmissionTimer to support autonomous CG-PUSCH retransmission. Furthermore, NR-U uses CG downlink feedback information (CG-DFI) to indicate HARQ-ACK of all UL HARQ processes, and support new transmission using ACK indication for each CG-PUSCH and autonomous CG-PUSCH retransmission, i.e., implicit NACK, after cg-RetransmissionTimer has expired.

In a controlled environment, LBT failure hardly happens, hidden node interference can be negligible, and the probability of miss-detecting UL transmission may be very low. Consequently, autonomous retransmissions after cg-RetransmissionTimer as defined in Rel-16 NR-U leads to unnecessary downlink control information (DCI) overhead. However, to maintain lower latency, the UE can leverage the feature of flexible HARQ ID selection in NR-U, rather than deterministic HARQ ID in eURLLC. In view of various kind of application scenarios, it is reasonable for a gNB, such as the gNB 20, to flexibly configure respective features among NR-U CG and URLLC CG.

An embodiment of the disclosure provides possible solutions harmonizing CG-PUSCH in NR-U and URLLC in an unlicensed band.

Embodiment 1: Configuration of UE's FFP Parameters

Embodiment 1-1: Values of 'Offset' and 'Period' for UE's FFP

An offset value between a gNB's FFP and a UE's FFP is introduced for the UE 10 to determine the starting position of the UE's FFP. FFP parameters of a UE-initiated FFP can be derived by the UE 10 using the following schemes.

For UE-initiated COT, the gNB 20 provides at least one set of FFP parameters via SIB1 (broadcast) or dedicated RRC configuration to a UE (e.g., the UE 10) or a group of UEs. The at least one set of FFP parameters associated with the UE is included in the configuration information for the UE 10 to perform COT initiation. The configuration information may be transmitted in an SIB1 or dedicated RRC signaling from the gNB 20 to one or more UE (e.g., the UE 10). The FFP parameters may comprise one or more of the following higher-layer parameters:

Channel Access Mode='semistatic';

Period ($T_x$), with the following possible values:

Existing value(s) selected from {1, 2, 2.5, 4, 5, 10} milliseconds (ms) configured in semiStaticChannelAccessConfig-r16;

New value(s) defined in Rel. 17: Note that a UE's FFP can be defined as an integer multiple or an integer factor of a gNB's FFP. A value of FFP periodicity associated with the FFP according to the set of FFP parameters associated with the UE may be an integer multiple or an integer factor of the value of the FFP periodicity associated with the FFP according to the set of FFP parameters associated with the base station. The value of FFP periodicity associated with the FFP according to the set of FFP parameters associated with the UE may be configured to be one of 1, 2, 2.5, 4, 5 or 10 ms.

Reused period values of periodically occurred resources configured in the RRC signaling. However, the period values of periodically occurred resources are subject to be overwritten by another explicit signaling, including:

A configured grant (CG);
A scheduling request (SR);
A sounding reference signal (SRS);
Periodic CSI feedback; or
Random access channel (RACH).

The offset value can be determined with respect to one or more of the following reference points:

the starting point of a gNB's FFP;
a radio frame boundary; and
a reference system frame number (SFN).

For example, in an embodiment, the FFP offset specifies a starting point of the FFP according to the set of FFP parameters associated with the UE, and a value of the FFP offset is configured with respect to a boundary of a radio frame.

Embodiment 1-2: Configuration of 'Offset' and 'Period' for UE's FFP

One or more than one set of period and offset values can be configured jointly, e.g., {period, offset} or individually, e.g., {period} and {offset} respectively, for a single UE, such as the UE 10.

The gNB 20 can create a mapping table with multiple sets of {period}, {offset} or {period, offset} values, each set corresponds to a row index in the table.

The mapping table can be created and signaled via RRC configuration. A set or more than one set of {period}, {offset} or {period, offset} values is selected based on the row index of the mapping table. The UE is configured with a set of FFP parameters based on a row index of a corresponding FFP parameter mapping table configured by the base station. The row index can be indicated semi-statically using cell-specific RRC, UE-specific RRC signaling, or dynamically in a field of DCI, an unused field, or a combination of different fields with a predefined code point. The field of DCI may be a newly created field. The DCI type of the DCI indicating the row index can be one of the following:

Unicast DCI for UL grant;
Unicast DCI for CG activation; and
Group common DCI for a group of UEs.

Values of {period}, {offset} or {period, offset} can be associated with other parameters or can be implicitly determined based on parameters in other configurations. Examples of other parameters or parameters in other configuration may comprise one or more of the following:

A location of a PRACH resource in RACH configuration.

A DL/UL time-division duplex (TDD) format.

CG periodicity in UL CG configuration: For example, the value of the period and the value of offset can be chosen to align with the starting point of initial transmission on any occasion associated with RV0.

A priority level in UL CG configuration: For example, different priority level corresponds to different value of offsets.

A location of a PUCCH resource for scheduling request (SR).

A location of a periodic CSI report resource.

The gNB 20 can generate more than one set of {period}, {offset} or {period, offset} candidates for the UE 10, the UE 10 can be configured by the base station or autonomously determine to use which set of FFP parameters and switches from a first set of FFP parameters to a second set of FFP parameters. The first set of FFP parameters is previously used by the UE 10, and the second set of FFP parameters is currently determined and used by the UE 10. However, the switching period should not violate the regulation, according to which the UE 10 cannot switch between sets of FFP parameters more than once every 200 ms. A set of FFP parameters may be referred to as a set of FFP configurations. In an embodiment, the UE is provided with options or indicated by the base station to switch from a first set of FFP parameters to a second set of FFP parameters if more than one set of FFP parameters are configured by the base station, and the UE switches to the second set of FFP parameters after the UE has adopted the first set of FFP parameters to perform semi-static channel access for at least 200 milliseconds.

The UE 10 can determine to apply which set of FFP configurations based on an RRC state and/or a UL traffic type of the UE 10. The RRC state of the UE 10 may comprise RRC_IDLE state, RRC_inactive state, or in an RRC_CONNECTED state. For example, an UL traffic type of the UE 10 may comprise urgent or non-urgent traffic types, mission-critical or non-mission critical traffic type, URLLC or non-URLLC traffic type, and others. In an embodiment, a set of FFP parameters in the at least one set of FFP parameters is configured in SIB1 for the UE operating in an RRC_IDLE state, and another set of FFP parameters in the at least one set of FFP parameters is configured in dedicated RRC signaling for the UE operating in an RRC_CONNECTED state.

The UE 10 may notify the gNB 20 of its FFP parameters of {period}, {offset} or {period, offset} selected by the UE 10 via an uplink signal/channel if the UE 10 can autonomously determine to choose a set of FFP parameters.

The default values of the period and the offset for UE's FFP can be provided by SIB1 from the gNB 20. The default values of the period and the offset for UE's FFP can be the same or not the same as gNB's FFP. Each set of the at least one set of FFP parameters includes an FFP periodicity and an FFP offset associated with the UE for the UE to perform COT initiation. The at least one set of FFP parameters associated with the UE and at least one set of FFP parameters associated with the base station are separately configured.

Values of the period and the offset for UE's FFP can be overwritten. For example, dedicated RRC signalling with updated values of a set of FFP parameters can overwrite the default values of a set of FFP parameters configured by SIB1. Dynamic control information (e.g., DCI) with updated values of a set of FFP parameters can overwrite the values of a set of FFP parameters configured by higher layer RRC signalling.

Figure 5:
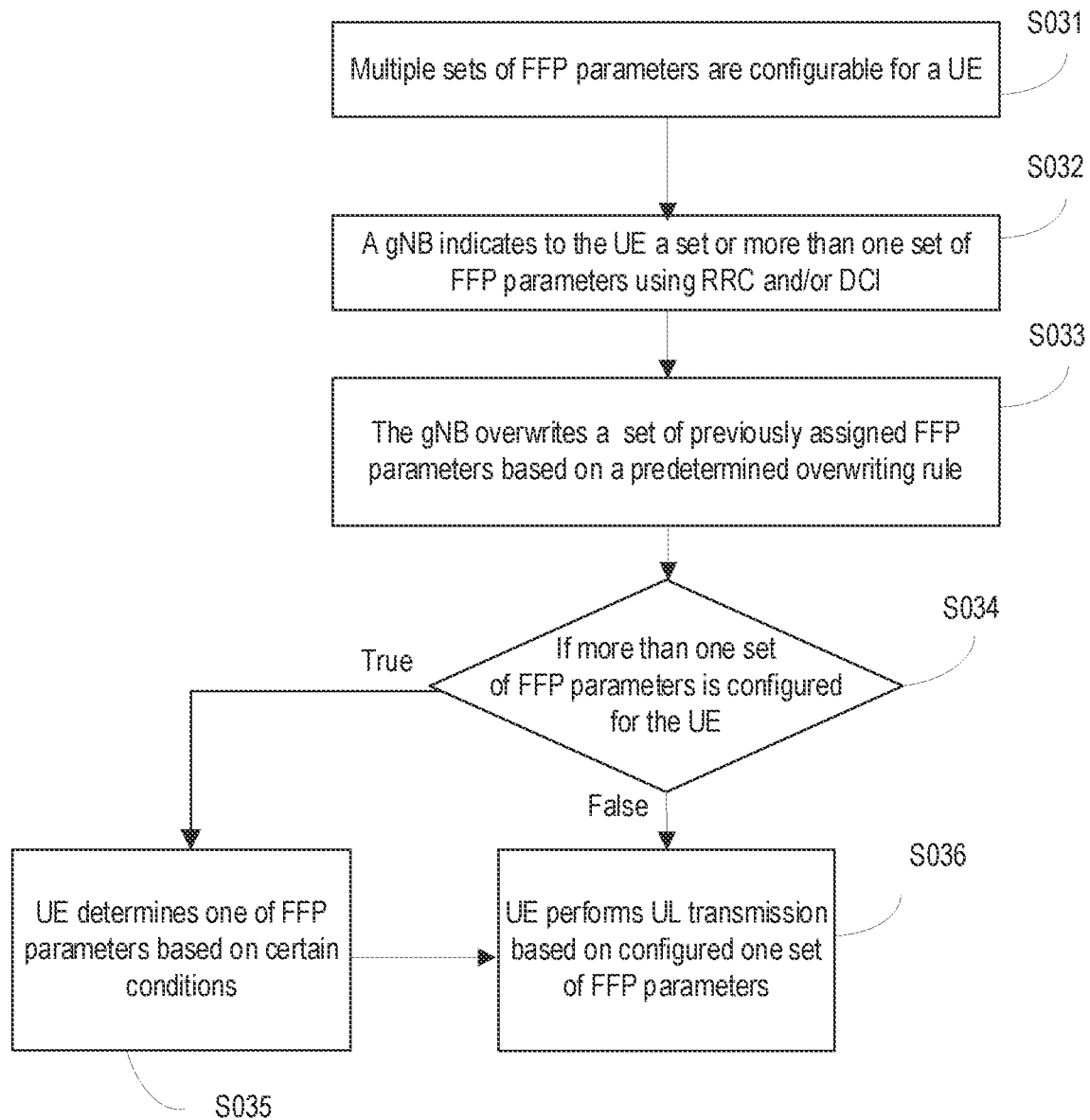
FIG. 5 illustrates a schematic view showing an example of a procedure for configuration of UE's FFP parameters.

Embodiment 1-2-1: An Example of a Procedure for Configuration of UE's FFP Parameters With reference to FIG. 5, multiple sets of FFP parameters, i.e., period and offset, are configurable for the UE 10 using RRC signaling (S031). For example, the gNB 20 configures sets of FFP parameters for the UE 10.

The gNB 20 can indicate to the UE 10 a set or more than one set of FFP parameters using RRC signaling and/or DCI (S032).

At least one set of previously configured FFP parameters can be overwritten by the FFP parameters indicated by the gNB 20 based on a predetermined overwriting rule (S033).

The UE 10 determines whether more than one set of FFP parameters are configured for the UE 10 (S034). If more than one set of FFP parameters are configured for the UE 10 (S034), the UE 10 can determine which set of FFP parameters to be applied based on certain conditions, such as an RRC state, or UL traffic type of the UE 10 (S035).

If only one set of FFP parameters are configured for the UE 10, the UE 10 initiates a COT and performs UL transmission based on the one set of FFP parameters (S036).

Embodiment 2: Stop Transmission Over a Restricted Region in an FFP

Embodiment 2-1: Restriction of UL Transmission from UE the UE 10 may restrict UL transmissions according to a location of a UE's COT and a location of an idle period of one of the other devices. Examples of the configurations of restrictive UL transmission is detailed in the following.

The UE 10 can determine whether any of the following restriction cases is applicable to the UE 10 according to a predefined rule. Additionally, the gNB 20 can indicate the UE 10 if any of the following restriction cases is applicable to the UE 10 via RRC signalling or dynamic DCI:

The UE 10 should refrain from UL transmission in the region of:
 Case 1: an idle period in an FFP of a UE that initiates the UE's COT;
 Case 2: an idle period in an FFP of a gNB (e.g., the gNB 20); and
 Case 3: idle period(s) in FFP(s) of one or more of the other UEs.

The UE that initiates the UE's COT is referred to as an initiative UE. Suppose restrictive UL transmission is required for the UE 10. The gNB 20 can provide at least one of the following information to a UE (e.g., the UE 10) or to a group of UEs via RRC signalling or dynamic DCI:
 COT duration and a location of a UE's COT and/or a location of idle period of the initiative UE's.
 COT duration and a location of a gNB's COT, corresponding idle period, and/or corresponding CCA (LBT) gap.
 COT duration and locations of other UEs' COTs, corresponding idle periods, and/or corresponding CCA (LBT) gaps.
 A number of overlapped COTs, each with corresponding FFP parameters.
 UL/DL location of TDD configuration.

The UE 10 can determine restricted region(s) for UL transmission based on indicated case(s) announced by the gNB 20 or based on a predetermined rule. A restricted region is a region where UL transmission is not allowed in the FFP where UE initiates the COT.

The UE 10 may restrict UL transmission over shared COT from one of the other UEs (i.e., the gNB 20 shares COT with one of the other UEs). The shared COT may comprise a UE-initiated COT of the one of the other UEs. The restricted region can be derived from one or more of the following types of information which belongs to the UE's FFP of the one of the other UEs:
 FFP parameters;
 COT duration; and
 an idle period location of the UE-initiated COT of one of the other UEs.

The various types of information can be provided by the gNB 20 via RRC signalling or dynamic indication via DCI, or can be derived based on UE's measurement over other UEs' UL transmission duration.

In an embodiment, one or more valid symbols for transmission of the UL burst are defined as at least one of the following:
 symbols intended for UL transmission are not located within an idle period of the FFP where UE initiates the COT.

In an embodiment, one or more valid symbols for transmission of the DL burst transmission are symbols not located within an idle period of the FFP according to the set of FFP parameters associated with the UE.

After temporarily stopping UL transmission due to restricted regions, one or more invalid symbols, or non-continuous UL scheduling, the UE 10 can resume transmission on an initiated COT using a certain channel access scheme if the length of transmission gap conforms to a requirement of a regulation defined for unlicensed band access, e.g., larger or smaller than 16 us.

Figure 6:
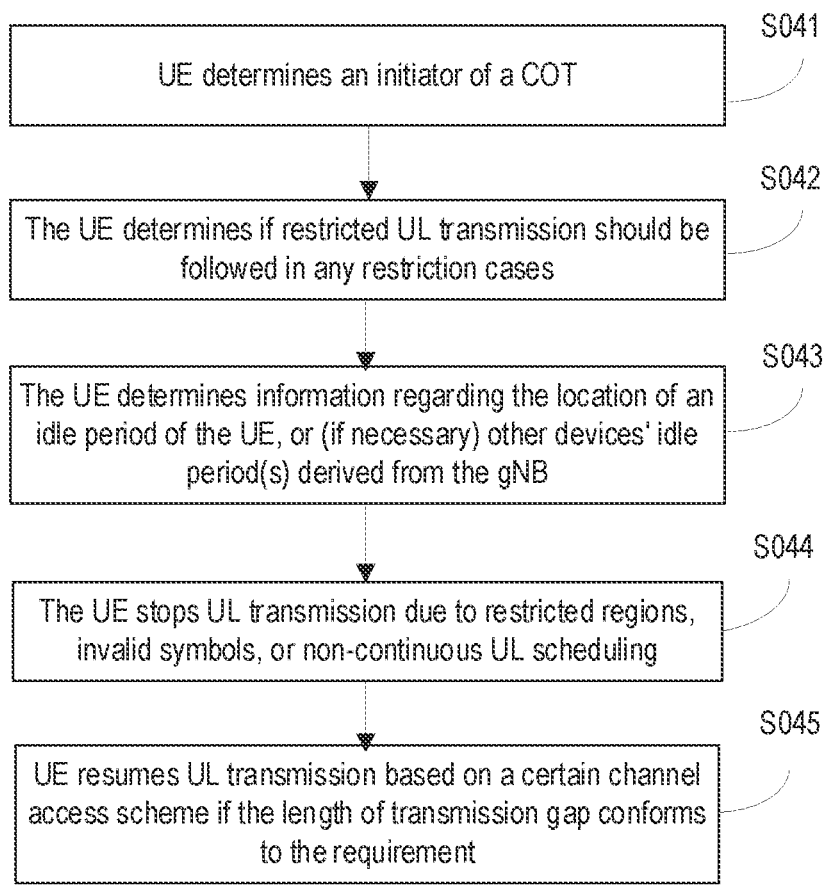
FIG. 6 illustrates a schematic view showing an example of a procedure for configuration of restrictive UL transmission.

Embodiment 2-1-1: An Example of a Procedure for Configuration of Restrictive UL Transmission With reference to FIG. 6, the UE 10 determines an initiator of a COT (S041). Specifically, the UE 10 determines if a COT is initiated by the UE 10 itself, the gNB 20, or one of the other UEs (S041).

The UE 10 determines if any case of restrictive UL transmission should be followed based on a predefined rule or rely on an indication from the gNB 20 (S042).

The UE 10 determines information regarding the location of an idle period of the UE 10, or (if necessary) other devices' idle period(s) derived from the gNB 20 (S043).

The UE 10 stops UL transmission due to restricted regions, one or more invalid symbols, or non-continuous UL scheduling (S044).

The UE 10 resumes UL transmission based on a certain channel access scheme if the length of the transmission gap conforms to a requirement (S045).

Embodiment 2-2: Restriction of DL Transmission in UE's COT

The gNB 20 may restrict DL transmissions when sharing COT from the UE. A restricted region is a region where DL transmission is not allowed in the FFP where UE initiates the COT. The restricted region can be derived from the following possible schemes.

An Idle Period of a UE-Initiated COT:

The restricted region can be derived from an idle period of an FFP where UE-initiates the COT. The idle period of the FFP associated with the UE can be configured by the gNB 20 via higher layer signalling, provided by the UE 10 via CG-UCI, or according to gNB's measurement over UE's UL transmission duration.

In an embodiment, one or more valid symbols for transmission of the DL burst are defined as at least one of the following:
- symbols intended for DL transmission are not located within an idle period of the FFP where UE initiates the COT.

In an embodiment, one or more valid symbols for transmission of the DL burst are symbols not located within an idle period of the FFP according to the set of FFP parameters associated with the UE.

After temporarily stopping DL transmission due to restricted regions, one or more invalid symbols, non-continuous DL scheduling, or DL/UL slot format restriction, the gNB 20 can resume transmission in a UE's COT using a certain channel access scheme depending on the length of transmission gap, e.g., larger or smaller than 16 us, of the stopped DL transmission.

Embodiment 3: Indication of UE-Initiated COT to UE

In addition to detection of the presence of a gNB-initiated COT shared by the gNB 20 based on DL channel(s)/signal(s), the gNB 20 can explicitly or implicitly indicate the UE 10 one or more information for UE 10 to determine whether or not to initiate a COT for UL transmission in at least one of the following FFPs.

Embodiment 3-1: Information Provided by gNB Regarding UE-Initiated COT

The gNB 20 can indicate the UE 10 explicitly or implicitly at least one of the following information:

COT type related capability: The capability information indicates whether UE-initiated COT is allowed.

COT sharing information: If UE-initiated COT is allowed, the UE 10 may receive the COT sharing information and determine whether or not the UE 10 can still use shared COT from the gNB 20 in case the UE 10 fails LBT in a UE-initiated COT.

COT type information: The COT type information indicates whether the DL transmission is transmitted according to a gNB-initiated COT of the gNB 20 or is transmitted according to a UE-initiated COT which is shared by the gNB 20 from one of the other UEs.

COT prioritization information: The COT prioritization information specifies which one of the FFP configurations is prioritized over other FFPs based on gNB's configuration, and/or associated FFP parameters for each of FFP configurations. UE-initiated COT should follow the FFP configuration specified in the COT prioritization information if more than one FFP configurations are configured for the UE 10.

COT location information: The COT location information provides locations of a number of subsequent FFPs that allow UE to perform UE-initiated COT. For example, the COT location information comprises a bitmap pattern to indicate the UE 10 location(s) of one or more FFPs that allows initiation of UE-initiated COT(s).

Embodiment 3-2: Priority or QoS Related Information for Triggering UE-Initiated COT The UE 10 can determine whether a UE-initiated COT or a shared gNB-initiated COT is used for UL transmission based on priority levels of UL traffic types or performance-related information of UL traffic types, which is detailed in the following:

Priority Levels of UL Traffic Types:

The priority levels of UL traffic types may be physical layer priority levels or medium access control (MAC) layer priority levels:
- Physical layer priority level: Examples of the physical layer priority levels may comprise one or more of:
  - Priority levels indicated in CG configuration;
  - Priority levels indicated in uplink grant DCI;
  - HARQ codebook priority for HARQ feedback; and
  - Channel access priority classes (CAPCs).
- MAC layer priority level: Examples of the MAC layer priority levels may comprise one or more of:
  - LCG (logic channel group) priority levels for triggering scheduling request(s); and
  - Logical Channel Prioritization (LCP) restrictions to prioritize grant resources for URLLC.

Performance-Related Information:

The performance-related information, for example, may comprise quality of service (QOS) or a latency requirement of serving traffic types and may be obtained from via time-sensitive network (TSC) assistance information (TSCAI).

Embodiment 3-3: Resource Location Related Information for Triggering UE-Initiated COT In an embodiment, for configured grant (DG) based UL scheduling, the scheduling information includes a location of a UL resource for configured grant UL transmission. For dynamic grant (DG) based scheduling, the DCI in PDCCH includes a location of a UL resource for dynamic grant UL transmission. The UE 10 can determine whether UE-initiated COT or shared gNB-initiated COT is used for UL transmission based on the resource location of CG or DG resource(s) in relation to the location of a UE's FFP or a gNB's FFP.

For the case that a CG or DG uplink resource starts at the starting point of a UE's FFP and ends before the idle period of UE's FFP, the following schemes can be used to determine whether the UE 10 initiated COT or the gNB 20 initiated the COT is used for UL transmission:

UE-initiated COT is assumed, the UE 10 can perform LBT immediately before a UE's COT in order to initiate the UE's COT.

The UE 10 determines either UE-initiated COT or gNB-initiated COT is applied (or activated) according to an indication from the gNB 20. The indication may be carried in RRC signaling or dynamic DCI. In an embodiment, the DCI further includes a COT-initiator information, the COT-initiator information indicates whether the dynamically scheduled UL transmission is based on UE-initiated COT or based on base-station-initiated COT. In an embodiment, the configuration information in FIG. 2A to FIG. 2C further includes an indication showing that the UE is allowed to perform a UE-initiated COT function. The configuration information may be transmitted in RRC signaling. In an embodiment, the configuration information FIG. 2A to FIG. 2C further includes an indication showing that the UE (e.g., UE 10) is allowed to perform a UE-initiated COT function.

The UE 10 can determine which COT type is applied based on a predefined decision rule which may be a rule shared or not shared between the UE 10 and gNB 20.

COT type determination at UE with decision rule(s) shared with the gNB 20: For example, according to a decision rule, the UE 10 selects a COT type whose idle period does not overlap with the CG or DG uplink resource. In another example, the UE 10 selects a COT type according to a priority level of the uplink traffic.

COT type determination at UE with decision rule(s) not shared with the gNB 20: For example, the UE 10 can autonomously decide a COT type. However, since the decision rule is not known to the gNB 20, the UE 10 can notify the gNB 20 of the selected COT type via an uplink signal (e.g., CG-UCI) over an uplink channel.

For the case that the CG or DG uplink resource does not start at the starting point of the UE's FFP UE, gNB-initiated COT is assumed, and the UE 10 can share gNB-initiated COT for uplink transmission.

For the case that the DG uplink resource is located outside of the gNB's current COT (e.g., the uplink resource scheduled in a COT of the gNB 20 which is different from the COT of the gNB 20 used for transmission of dynamic grant scheduling), UE-initiated COT is assumed.

For the case that the CG or DG uplink resource is located within both of the gNB' COT and the UE's COT, the COT type can be determined based on the following schemes:

Scheme 1:

In an embodiment, the DL information in FIG. 2A and FIG. 2B, is derived from a DL channel or a DL signal, which is transmitted at a starting point of an FFP according to a set of FFP parameters associated with the base station. The transmitted DL channel may include a PDCCH. DCI in the PDCCH may include resource location information for dynamically scheduled UL transmission from the UE.

If the UE 10 has detected DL channels/signals at the front portion of the gNB's FFP and/or the gNB 20 has indicated UE-initiated COT is not allowed, gNB-initiated COT is assumed for UL transmission.

Otherwise, if the uplink resource starts at the starting point of UE's FFP and/or the gNB 20 has indicated that UE-initiated COT is allowed, and/or the UE (e.g., the UE 10) has initiated a COT, UE-initiated COT is assumed for UL transmission.

Scheme 2:

If the uplink resource starts at the starting point of UE's FFP and/or the gNB 20 has indicated that UE-initiated COT is allowed, and/or the UE 10 has initiated a COT, UE-initiated COT is assumed for UL transmission.

Otherwise, if the UE 10 has detected DL channels/signals at the front portion of gNB's FFP and/or the gNB 20 has indicated UE-initiated COT is not allowed, gNB-initiated COT is assumed for UL transmission.

In an embodiment, in the FIG. 2A, at least one condition in the configuration information, at least one condition in the scheduling information, and the detection result of detecting transmission of the DL information comprise at least one of the following:

the configuration information comprises at least one set of FFP parameters associated with the UE or an indication showing that a UE-initiated COT function is allowed;

the scheduling information includes UL resource location information for configured grant UL transmission in the UL burst, the UL resource location information indicates a location of a UL resource for the configured grant UL transmission, a starting location of the UL resource for the configured grant UL transmission is aligned with a starting point of the FFP according to the set of FFP parameters associated with the UE; and the UL resource for the configured grant UL transmission in the scheduling information is located within a COT of the FFP according to the set of FFP parameters associated with the base station, and the UE does not detect DL information from a starting point of the FFP according to the set of FFP parameters associated with the base station.

In an embodiment, in the FIG. 2B, the at least one condition in the configuration information and the at least one condition in the DL information comprise at least one of the following:

a DCI in the DL information includes resource location information and COT-initiator information for dynamically scheduled UL transmission, the resource location information indicates a location of a UL resource scheduled for the dynamically scheduled UL transmission, and the COT-initiator information indicates that the dynamically scheduled UL transmission is based on a UE-initiated COT.

In an embodiment, in the FIG. 2B, the at least one condition in the configuration information and the at least one condition in the DL information for comprise at least one of the following:

the configuration information comprises at least one set of FFP parameters associated with the UE or an indication showing that a UE-initiated COT function is allowed;

the UE receives the DL information, but the DL information is not transmitted from a starting point of an FFP according to a set of FFP parameters associated with the base station; and a DCI in the DL information includes resource location information for dynamically scheduled UL transmission in the UL burst, the resource location information indicates a location of a UL resource scheduled for the dynamically scheduled UL transmission, and a starting location of the dynamically scheduled UL transmission is aligned with a starting point of the FFP according to the set of FFP parameters associated with the UE.

In an embodiment, in the FIG. 2B, the at least one condition in the configuration information and the at least one condition in the DL information comprise at least one of the following:

the UE receives the DL information in an FFP according to a set of FFP parameters associated with the base station, a DCI in the DL information includes resource location information for dynamically scheduled UL transmission, the resource location information indicates a location of a UL resource scheduled for the dynamically scheduled UL transmission in the UL burst, the UL resource scheduled for the dynamically scheduled UL transmission is located in a later FFP outside of a base-station-associated FFP scheduling the dynamically scheduled UL transmission, and a starting location of the dynamically scheduled UL transmission is aligned with a starting point of the FFP according to the set of FFP parameters associated with the UE.

In an embodiment, in the FIG. 2B, wherein the at least one condition in the configuration information and the at least one condition in the DL information comprise at least one of the following:

the UE receives the DL information in an FFP according to a set of FFP parameters associated with the base station, a DCI in the DL information includes resource location information and a COT-initiator information for dynamically scheduled UL transmission, the resource location information indicates a location of a UL resource scheduled for the dynamically scheduled UL transmission in the UL burst, the UL resource scheduled for the dynamically scheduled UL transmission is located in a later FFP outside of a base-station-associated FFP scheduling the dynamically scheduled UL transmission, and the COT-initiator information indicates that the dynamically scheduled UL transmission is based on a UE-initiated COT.

Embodiment 3-3-1: An Example of a Procedure for Triggering UE-Initiated COT Based on Scheme 1 of Embodiment 3-3

Figure 7:
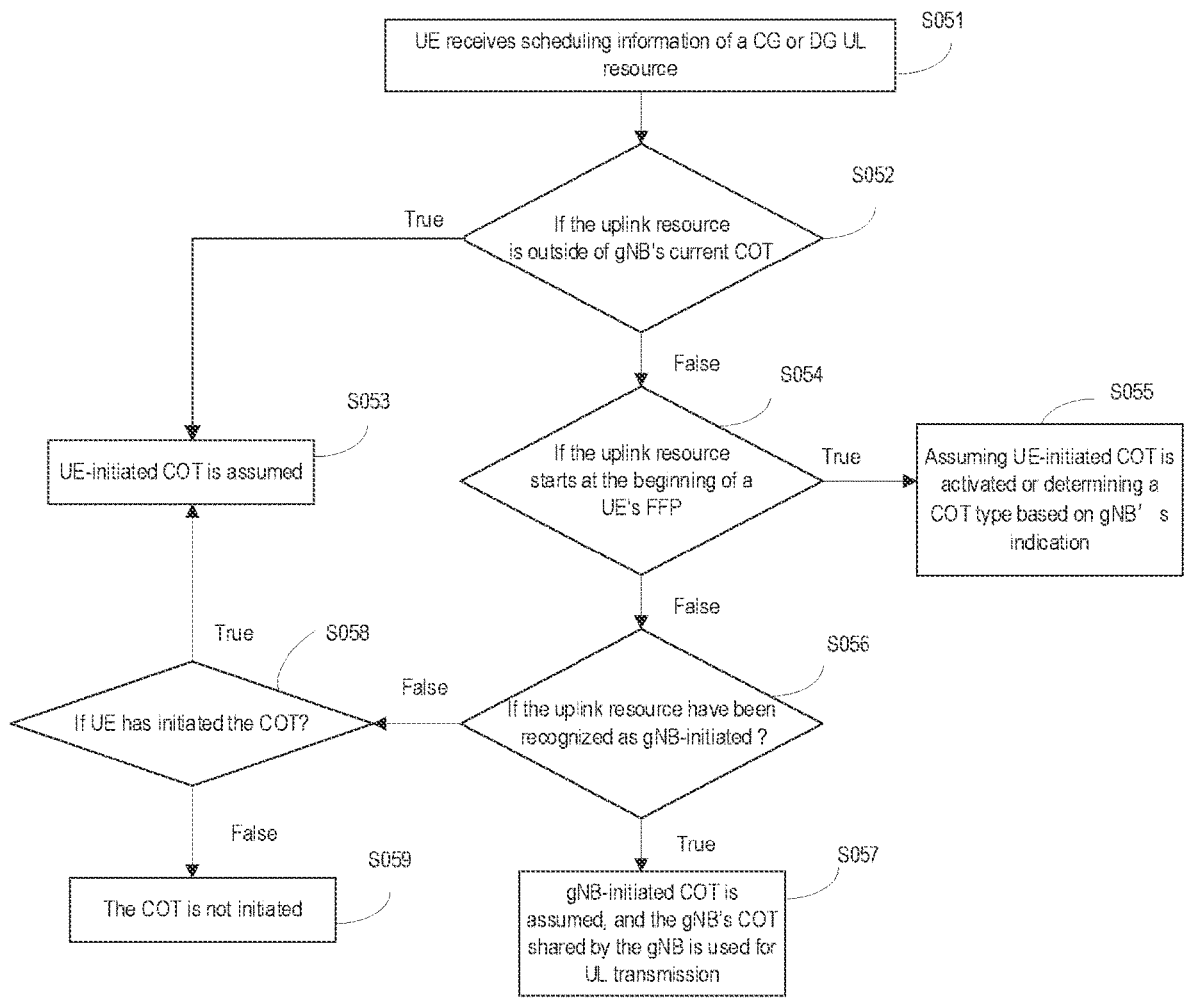
FIG. 7 illustrates a schematic view showing an example of a procedure for triggering UE-initiated COT.

With reference to FIG. 7, the UE 10 receives scheduling information of a CG or DG uplink resource (S051) and determines if the uplink resource is located outside of a current COT of the gNB 20, referred to as gNB's current COT (S052). If the uplink resource is located outside of the current COT of the gNB 20, UE-initiated COT is assumed for UL transmission (S053).

If the uplink resource is located within both of the gNB's COT and the UE's COT, the UE 10 determines if the uplink resource starts at the starting point of a UEs' FFP (S054).

If the uplink resource starts at the starting point of the UEs' FFP (S054), the UE 10 assumes UE-initiated COT is activated or determines a COT type based on gNB's indication (S055).

If the uplink resource does not start at the starting point of the UEs' FFP (S054), the UE 10 determines whether the uplink resource of a COT to be initiated is a gNB-initiated COT (S056). For example, the UE 10 may determine whether the location of the uplink resource is a gNB-initiated COT or a UE-initiated COT based on DL channel/signal detection or based on an indication from the gNB 20. In an embodiment, in FIG. 2A, the DL information (e.g., DL channel/signal detection) is derived from a DL channel or a DL signal transmitted at a starting point of the FFP according to a set of FFP parameters associated with the base station for UE to determine whether the gNB 20 has initiated a gNB's COT.

If the location for uplink transmission has been recognized as a gNB-initiated COT (S056), gNB-initiated COT is assumed, and the gNB's COT shared by the gNB 20 is used for UL transmission (S057).

If the location for uplink transmission is not recognized as a gNB-initiated COT, the UE 10 determines whether the location for uplink transmission in the COT has been initiated by the UE 10 (S058). If the location for uplink transmission in the COT has been initiated by the UE 10 (S058), UE-initiated COT is used for UL transmission (S053). Otherwise, the COT is not initiated (S059).

Embodiment 3-4: RRC State Information for Triggering UE-Initiated COT

The UE 10 can determine whether UE-initiated COT or shared gNB-initiated COT is used for UL transmission based on an RRC state of the UE 10. The RRC state of the UE 10 may comprise one of RRC_IDLE state, RRC_INACTIVE state or RRC_CONNECTED state. In an embodiment, in the FIG. 2A, the at least one condition in the configuration information, at least one condition in the scheduling information, and the detection result of detecting transmission of the DL information further comprise a condition that the UE is operated in an RRC_CONNECTED state.

For example, when the UE 10 in an RRC_IDLE state or RRC_inactive state, gNB-initiated COT is applied. When the UE 10 in an RRC_connected state, UE-initiated COT is assumed.

Embodiment 3-5: Uplink Resource Availability for Triggering UE-Initiated COT

In an embodiment, in the FIG. 2A, the at least one condition in the configuration information, at least one condition in the scheduling information, and the detection result of detecting transmission of the DL information further comprise a condition that the UL resource is a valid UL resource for performing COT initiation by the UE. The UL resource is a valid UL resource for performing COT initiation by the UE if symbols within the UL resource satisfies at least one of the following conditions:

symbols in the UL resource are not indicated as DL symbols by the base station; and symbols in the UL resource are not cancelled by the base station.

In an embodiment, one or more valid symbols for transmission of the UL burst are defined as at least one of the following:

symbols intended for UL transmission are not located within an idle period of the FFP where UE initiates the COT;

symbols intended for UL transmission are not indicated as DL symbols in a slot format indication (SFI); and symbols intended for UL transmission are not cancelled by the base station.

The UE 10 can determine whether UE-initiated COT or shared gNB-initiated COT is used for UL transmission based on the availability of CG or DG uplink resource(s) at the beginning of a UE's FFP. If an uplink resource is available at the beginning of a UE's FFP, UE-initiated COT is assumed. If an uplink resource is not available at the beginning of a UE's FFP, gNB-initiated COT is assumed. In an embodiment, a starting location of dynamically scheduled UL transmission is aligned with a starting point of the FFP according to the set of FFP parameters associated with the UE.

The gNB 20 can configure the availability of CG or DG uplink resource(s) for UE-initiated COT using one or more of the following schemes:

Using group-common DCI (GC-DCI) to indicate the availability of CG or DG uplink resource(s) based on one of following indications:

Slot format indication (SFI) in DCI format 2_0.
   The gNB 20 can disable UE-initiated COT if the uplink resource for UL transmission at the beginning of UE's FFP is not valid.
Uplink cancellation indication (CI) in DCI format 2_4.
   The gNB 20 can disable UE-initiated COT if UL transmission at the beginning of the UE's FFP is canceled.
Other newly created indications in GC-DCI.

Embodiment 3-6: Explicit Indication Scheme for Triggering UE-Initiated COT

The gNB 20 can explicitly indicate the UE-initiated COT using any one or any combinations of the following schemes:
RRC Configuration Indicating Support of a COT Type for Single FFP or Triggering of a COT Type for Single FFP:
   The gNB 20 can use new RRC configuration to indicate a COT type for a single FFP. For example, for the UE 10 having higher priority traffic, UE-initiated COT is configured; otherwise, gNB-initiated COT is configured.
   The gNB 20 can reuse an existing RRC configuration, i.e., CG configuration, and add an additional field to indicate that the UE-initiated COT is supported. In an embodiment, the COT-initiator information is jointly encoded in an existing field used for load-based equipment (LBE) in dynamic channel access.
RRC Configuration Indicating COT Type(s) for Multiple FFPs:
   The gNB 20 can use RRC configuration to indicate COT type(s) for a multiple FFP. For example, the gNB 20 uses bitmap as an indication of COT types for more than one upcoming FFPs. Each bit value of 1 or 0 in the bitmap can represent UE-initiated COT or gNB-initiated COT respectively. The gNB 20 can create a table with multiple row indices via RRC signaling, each index maps to one of multiple sets of bitmaps to indicate COT types of multiple FFPs. The gNB 20 can dynamically send DCI to the UE 10 to indicate a row index of the table to determine the selected bitmap of COT types.
MAC CE:
   The gNB 20 can use a newly created MAC CE or an existing MAC CE to indicate triggering of UE-initiated COT or gNB-initiated COT.
   Dynamic DCI: The gNB 20 can use dynamic DCI to indicate triggering of UE-initiated COT or gNB-initiated COT, of which some examples are detailed in the following:
   The gNB 20 can use an explicit parameter in DCI to indicate a COT Type. This parameter can be combined with the settings of FFP parameters.
   For UL CG type 2 configuration, the gNB 20 can use activation DCI to indicate a COT type. In an embodiment, the COT-initiator information is located in an activation DCI used for scheduling Type 2 CG PUSCH transmission.
   The gNB 20 can use group common DCI to allow a group of UEs to perform UE-initiated COT. For example, the gNB 20 can reuse the existing group common DCI format 2_0 to indicate a COT duration or SFI information. The COT-initiator information is located in a group common DCI for indicating a COT-initiator for a group of UEs.
   The bit field used for indication of UE-initiated COT can be one of the following:
      An existing field for indication of LBT type for LBE;
      A specifically defined field, other than existing fields in the DCI;
      Any combination of more than one fields with a specific code point;
      A non-used field for FBE, which is borrowed from the LBE case; or
      The bit field jointly encoded with another bit field.

Embodiment 3-7: Implicit Indication Scheme for Triggering UE-Initiated COT

The gNB 20 can implicitly indicate triggering (or activation) of the UE-initiated COT using any one or any combinations of the following schemes.
Dynamic DCI:
   The gNB 20 can use dynamic DCI to indicate triggering of UE-initiated COT or gNB-initiated COT. The bit field in DCI used for indication of UE-initiated COT can be an existing field for indication of an LBT type for LBE.
      For example, Type 2 LBT (i.e., no LBT) means that gNB-initiated COT is triggered since, in this case, PUSCH is transmitted within a shared gNB-initiated COT.
      For example, Type 1 LBT (i.e., CCA of 9 us) means UE-initiated COT requiring 9 us CCA is triggered since, in this case, PUSCH transmission is outside of a shared gNB-initiated COT.
Uplink Resource Location:
   The gNB 20 can use a location of a CG or DG uplink resource for UL transmission with respect to the location of a UE's FFP to indicate triggering of UE-initiated COT or gNB-initiated COT. For example, if the uplink resource starts at the beginning of UE's FFP, UE-initiated COT is assumed.
Energy Detection (ED) Threshold Value:
   The gNB 20 can use an ED threshold value to indicate triggering of UE-initiated COT or gNB-initiated COT. For example, if UE-initiated COT is preferred, the ED threshold value for LBT is set lower, and the UE 10 shares a UE-initiated COT to the gNB 20. For example, if gNB-initiated COT is preferred, the ED threshold value is set higher for ease of UL transmission.

Embodiment 3-8: Overwriting Mechanisms for UE-Initiated COT Indication

The gNB 20 can send an overwriting indication of an updated COT type to the UE 10, thus overwriting a previous indication of a previous COT type. The previous indication of the previous COT type may be previous sent from the gNB 20 to the UE 10 or previously determined by the UE 10. In an embodiment, the COT-initiator information in the activation DCI overwrites the COT-initiator determination according to a decision rule used for CG UL transmission. Indication of a COT type can be overwritten with the following possible schemes:
   Dynamic control information (e.g., DCI) with the overwriting indication of an updated COT type can overwrite the COT type previously configured by a higher-layer RRC signalling. For example, an indication of a COT type in dynamic DCI can overwrite a COT type configured in CG uplink transmission.

Dedicated RRC signalling with the overwriting indication of an updated COT type can overwrite the default setting of COT type, which may be, for example, configured by SIB1.

In an embodiment, the COT-initiator information in the DCI overwrites COT-initiator information in a previously received DCI. Group-common DCI with the overwriting indication of an updated COT type can overwrite a COT type based on a newly created DCI format or an existing DCI format. For example, the gNB 20 reuses existing group common DCI format 2_0 used for indicating COT duration or SFI information as the overwriting indication of an updated COT type to instantaneously overwrite the previously determined COT type.

Embodiment 4: UE-Initiated COT for UL Transmission During a RACH Procedure

The UE 10 may initiate a UE-initiated COT for UL transmission during a RACH procedure to transmit uplink signals including PRACH, HARQ-ACK, Msg3, and others.

Embodiment 4-1: UE-Initiated COT During a RACH Procedure in an RRC State

The UE 10 can perform UE-initiated COT during a RACH procedure in an RRC_IDLE, RRC_INACTIVE or RRC_CONNECTED state, and the information necessary for performing UE-initiated COT is detailed in the following:

In an embodiment, the configuration information in FIGS. 2A, 2B, and 2C is transmitted in an SIB1, Msg2, Msg4, MsgB, PDCCH for Msg3 retransmission, or dedicated RRC signaling, and the configuration information includes at least one set of FFP parameters associated with the UE for performing COT initiation.

The gNB 20 and the UE 10 may use information supportive of UE-initiated COT and/or corresponding UE FFP parameters during a random access channel (RACH) procedure. The information supportive of UE-initiated COT and/or corresponding UE FFP parameters may be included in the configuration information in FIGS. 2A, 2B, and 2C and comprise one or more of the following:

COT type: Whether UE-initiated COT, gNB-initiated COT, or both of UE-initiated COT and gNB-initiated COT is supported for UL transmission by one or more UEs (e.g., the UE 10).

A period and/or an offset of FFP for UE-initiated COT(s):
The UE 10 can use default FFP parameters or use FFP parameters the same as gNB-initiated COT if parameters for UE's FFP are not configured. FFP parameters are parameters for configuring UE's FFP. In an embodiment, at least one set of FFP parameters associated with the UE is the same as a set of FFP parameters configured for the base station.

In an embodiment, a value of the FFP periodicity associated with the UE is derived from a periodicity of a PRACH resource configured for the UE, and a value of the FFP offset associated with the UE is derived from a location of a PRACH resource configured for the UE. Parameters of a period and an offset of a UE's FFP can be the same as the period and offset of a PRACH resource. Parameters of a period and an offset of a UE's FFP may be referred to as a period parameter and an offset parameter. That is, parameters of a period and an offset of a UE's FFP can follow the parameters in PRACH configuration.

Conditions for restriction of a UE-initiated COT:
For example, one of the conditions specifies whether one or more UEs (e.g., the UE 10) are allowed to transmit PRACH using a UE-initiated COT in an idle period of a gNB's FFP.

For example, one of the conditions specifies whether one or more UEs (e.g., the UE 10) are allowed to transmit PRACH using UE-initiated COT in a clear channel assessment (CCA) region of gNB's FFP.

Embodiment 4-2: Implicit Indication Scheme for Indicating a UE-Initiated COT and a Corresponding FFP Parameter During RACH The UE 10 may be implicitly indicated an UL transmission based on a UE-initiated COT with a corresponding FFP parameter or a gNB-initiated COT with a corresponding FFP parameter during RACH through an RRC state of the UE 10, an uplink channel type, or a detection of downlink channel/signal, which is detailed in the following.

Implicit Indication Based on the RRC State of the UE 10:
The UE 10 may be implicitly indicated an UL transmission based on a UE-initiated COT with a corresponding FFP parameter or a gNB-initiated COT with a corresponding FFP parameter during RACH through an RRC state of the UE 10. For example, if the UE 10 performs an UL transmission during RACH in an RRC_CONNECTED state for uplink synchronization, the scheme of UE-initiated COT is assumed activated between the one or more UE (e.g., the UE 10) and the gNB 20. Each of the UE 10 and the gNB determines that a COT type of a COT initiated is a UE-initiated COT when the UE 10 performs an UL transmission during RACH in the RRC_CONNECTED state.

For example, if the UE 10 performs an UL transmission during RACH in an RRC_IDLE or RRC_INACTIVE states, the scheme of gNB-initiated COT is assumed between the one or more UE (e.g., the UE 10) and the gNB 20. Each of the UE 10 and the gNB determines that a COT type of a COT initiated is a gNB-initiated COT when the UE 10 performs an UL transmission during RACH in the RRC_IDLE or RRC_INACTIVE states.

Implicit Indication Based on the Uplink Channel:
The UE 10 may be implicitly indicated an UL transmission based on a UE-initiated COT with a corresponding FFP parameter or a gNB-initiated COT with a corresponding FFP parameter during RACH through an uplink channel type transmitted by the UE 10. For example, if the uplink channel is a PRACH, the default setting of a COT type in is UE-initiated COT. That is, when the gNB receives PRACH from the UE 10, the scheme of UE-initiated COT is assumed activated between the one or more UE (e.g., the UE 10) and the gNB 20. Each of the UE 10 and the gNB determines that a COT type of a COT initiated is a UE-initiated COT when the UE 10 performs PRACH transmission.

The set of FFP parameters (e.g., a period and/or an offset) of the UE-initiated COT can be configured with one or more of the following settings:

Explicitly indicated: The set of FFP parameters (e.g., a period and/or an offset) of the UE-initiated COT is explicitly indicated.

Same as the occurrence of PRACH resource occasion by default: The parameters of a period and an offset of a UE's FFP can be the same as the parameters in PRACH configuration.

Same as gNB's FFP parameters by default. The parameters of a period and an offset of a UE's FFP can be the same as the parameters of a gNB's FFP.

The default setting of the COT type or corresponding FFP parameter could be overwritten by another setting of the COT type or FFP parameter in an indication, e.g., dedicated RRC signaling or DCI. For example, at least one set of FFP parameters associated with the UE is configured in SIB1, and the at least one set of FFP parameters associated with the UE configured in SIB1 is overwritten by a set of FFP parameters configured in a dedicated RRC signal.
Implicit Indication Based on the Detection of Downlink Channels/Signals, e.g., SSB, CORESET #0, SIB:

In an embodiment, the DL transmission includes SSB, CORESET #0, SIB, Msg2, or PDCCH for Msg3 retransmission, which is transmitted from a starting point of the FFP according to the set of FFP parameters associated with the base station. The UE 10 may be implicitly indicated an UL transmission based on a UE-initiated COT with a corresponding FFP parameter or a gNB-initiated COT with a corresponding FFP parameter during RACH through detection of a downlink channel/signal sent from the gNB 20 to the UE 10 as an implicit indication. The implicit indication based on the detection of downlink channels/signals may comprise SSB, CORSET #0, or SIB. If downlink channels/signals can be detected by one or more UE (e.g., the UE 10) during a COT, gNB-initiated COT is assumed; otherwise, UE-initiated COT is assumed. That is, if downlink channel(s) or signal(s) can be detected by one or more UE (e.g., the UE 10) during a COT, the COT type of the COT is gNB-initiated COT. That is, when downlink channel(s) or signal(s) can be detected by one or more UE (e.g., the UE 10) during a COT, the scheme of gNB-initiated COT is assumed between the one or more UE (e.g., the UE 10) and the gNB 20, and each of the UE 10 and the gNB determines that a COT type of a COT initiated is a gNB-initiated COT.

If downlink channel(s) or signal(s) cannot be detected by one or more UE (e.g., the UE 10) during a COT, the default setting of a COT type of the COT is UE-initiated COT. That is, when downlink channel(s) or signal(s) cannot be detected by one or more UE (e.g., the UE 10) during a COT, the scheme of UE-initiated COT is assumed between the one or more UE (e.g., the UE 10) and the gNB 20, and each of the UE 10 and the gNB determines that a COT type of a COT initiated is an UE-initiated COT.

Figure 8:
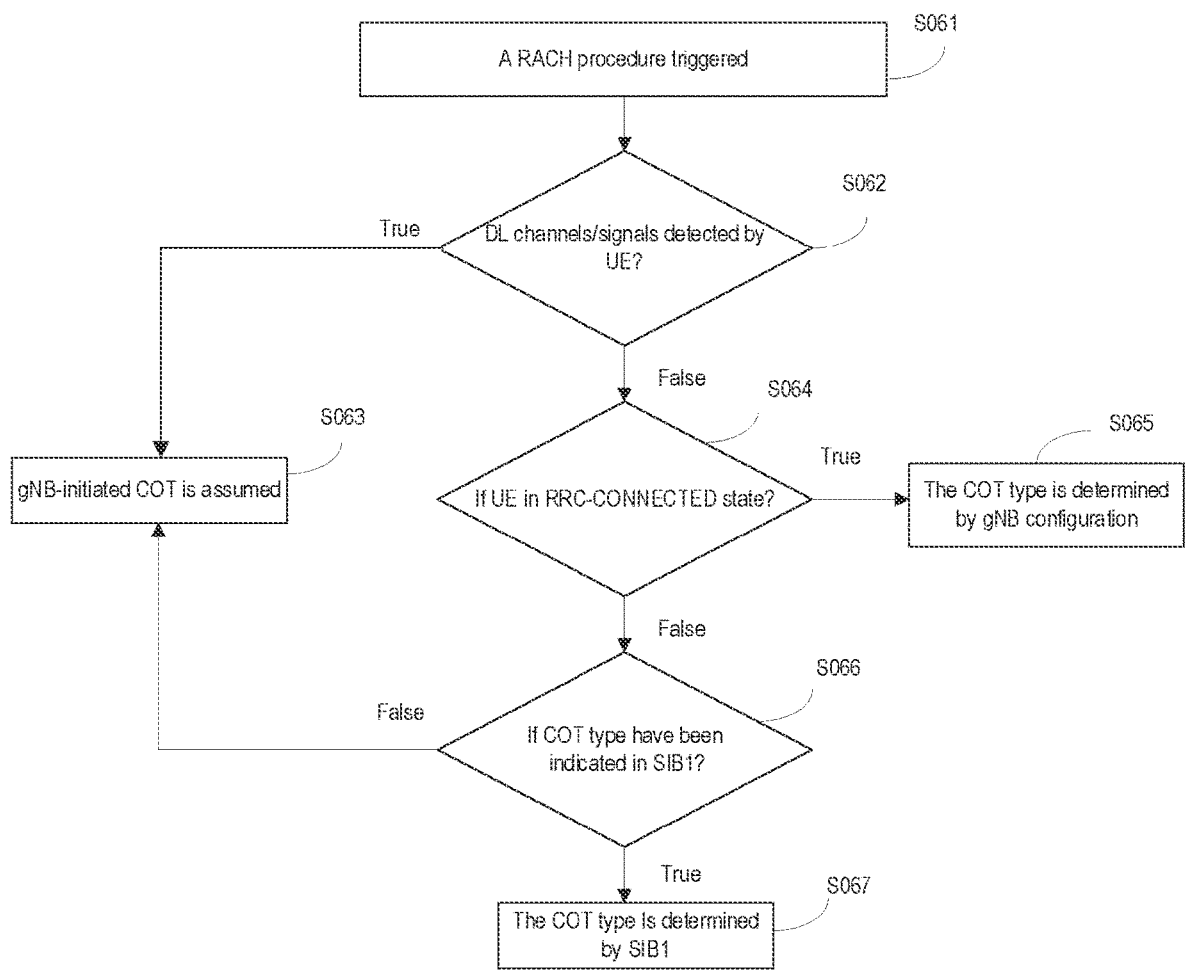
FIG. 8 illustrates a schematic view showing an example of a procedure for determining a COT type during RACH.

Embodiment 4-2-1: An Example of a Procedure for Determining a COT Type During RACH With reference to FIG. 8, a RACH procedure between the gNB 20 and the UE 10 is triggered based on certain conditions (S061)

If downlink channels/signals have been detected by the UE 10 (S062), gNB-initiated COT is assumed for PRACH transmission (S063). If downlink channels/signals cannot be detected by the UE 10, the UE 10 determines whether the UE 10 is in the RRC_CONNECTED state (S064).

If downlink channels/signals cannot be detected by the UE 10, and if the UE 10 is in the RRC_CONNECTED state (S064), the COT type can be determined based on configuration by the gNB 20 (S065). A configuration configured by the gNB 20 may be referred to as a gNB configuration in the description. If the UE 10 is in the RRC_CONNECTED state, the UE 10 may be in an RRC_IDLE state. If the UE 10 is in an RRC_IDLE state and the UE 10 receives an indication that indicates a COT type in SIB1 (S066), the UE 10 follows the indication in SIB1 (S067). Otherwise, gNB-initiated COT is assumed for PRACH transmission (S063).

Embodiment 4-3: Explicit Indication Scheme for a UE-Initiated COT and Corresponding FFP Parameter(s) During RACH In an embodiment, the configuration information in FIGS. 2A, 2B, and 2C is transmitted in an SIB1, Msg2, Msg4, MsgB, PDCCH for Msg3 retransmission, or dedicated RRC signaling, and the configuration information includes at least one set of FFP parameters associated with the UE for performing COT initiation.

The UE 10 may be explicitly indicated regarding a UE-initiated COT with a corresponding FFP parameter or a gNB-initiated COT with a corresponding FFP parameter during RACH through an SIB1, RRC signaling, a downlink message in four-step RACH or two-step RACH, which is detailed in the following.
- SIB1 (RMSI): The UE 10 may receive a broadcast channel in SIB1 (RMSI) to be indicated UE-initiated COT and/or corresponding FFP parameter(s).
- The UE 10 may receive a dedicated RRC signaling to be indicated UE-initiated COT and/or corresponding FFP parameter(s) if the UE 10 enters RRC_CONNECTED state.
- The UE 10 may receive a Msg2 or Msg4 in four-step RACH to be indicated UE-initiated COT and/or corresponding FFP parameter(s). Accordingly, subsequent one or more uplink transmissions, such as Msg3 or Msg5, can be transmitted in the UE-initiated COT.
- The UE 10 may receive a MsgB in two-step RACH to be indicated UE-initiated COT and/or corresponding FFP parameters. Accordingly, subsequent one or more uplink transmissions after MsgB can be transmitted in the UE-initiated COT.

In an embodiment, the configuration information in an SIB1 further includes a resource location information for UL transmission on a PRACH. The configuration information in an Msg2 further includes a resource location information for UL transmission in an Msg3. The configuration information in a PDCCH for Msg3 retransmission further includes a resource location information for UL transmission in an Msg3 retransmission.

In an embodiment, the UL burst is PRACH transmission, and the at least one condition in the configuration information and the detection result of detecting the DL transmission comprise at least one of the following:
- a starting location of an UL resource configured in SIB1 for PRACH transmission transmitted by the UE is aligned with a starting point of the FFP according to the set of FFP parameters associated with the UE; and
- the UL resource for PRACH transmission transmitted by the UE is located within the FFP according to the set of FFP parameters associated with the base station, and the UE does not detect the DL transmission from a starting point of the FFP according to the set of FFP parameters associated with the base station.

In an embodiment
the UL burst is Msg3 transmission or Msg3 retransmission, and the at least one condition in the configuration information and the detection result of detecting the DL transmission comprises at least one of the following:
- a starting location of an UL resource scheduled in a Msg2 for Msg3 transmission, or an UL resource scheduled in a PDCCH for Msg3 retransmission is aligned with a starting point of the FFP according to the set of FFP parameters associated with the UE; and the UL resource for Msg3 transmission or Msg3 retransmission is located within the FFP according to the set of FFP parameters associated with the base station, and the UE does not detect DL transmission from the starting point of the FFP according to the set of FFP parameters associated with the base station.

Embodiment 4-4: GNB can Share a UE-Initiated COT for DL Transmission During a RACH Procedure The gNB 20 can share a UE-initiated COT from one or more UE (e.g., the UE 10), and performs DL transmission during a RACH procedure in the UE-initiated COT.

For example, the gNB 20 can share the UE-initiated COT from one or more UE (e.g., the UE 10), and transmits Msg2 (random access response, RAR) after detecting Msg1 (PRACH) from the UE 10 or transmits Msg4 after detecting Msg3 transmission from the UE 10.

Whether the gNB 20 should refrain from DL transmission over an idle period of UE's FFP can be predetermined, configurable, or notified by the UE 10.

Embodiment 4-5: Restrictions of the UE-Initiated COT for Uplink Transmission During a RACH Procedure in an RRC_IDLE State If any one of the UL transmissions during UE-initiated COT is conflicted with an idle period of a gNB's FFP, at least one of the following strategies can be adopted:
The UE 10 skip the UL transmission as long as the UL transmission coincides or overlaps with the idle period of the gNB's FFP of the gNB 20.
The gNB 20 can transmit an indication to the UE 10 to indicate whether the UE 10 can perform UL transmission over the idle period of the gNB's FFP. The indication scheme may comprise one or more of:
Dynamic groupcast or unicast DCI;
RRC configuration;
Medium access control (MAC) control element (CE); and
A predetermined rule.

For example, the predetermined rule may comprise a default setting, whereby the UE 10 determines UE's behavior regarding whether to perform UL transmission over an idle period of a gNB's FFP according to the default setting. The predetermined rule can be subject to be overwritten. In another example, the predetermined rule may comprise priority level information relevant to a specific traffic the UE 10 obtains from higher layer signaling.

Embodiment 5: UL Transmission Overlapping with an Idle Period

Embodiment 5-1: UE-Initiated COT with UL Transmission Overlapping with an Idle Period In an embodiment, in the FIG. 2A to FIG. 2C, transmission of the UL burst in the FFP according to the set of FFP parameters associated with the UE includes repetitions of UL transmission, and when a nominal repetition in the repetitions coincides or overlaps with one or more invalid symbols, the nominal repetition is segmented into actual repetitions based on PUSCH repetition type B, or the nominal repetition is not transmitted.

In the description, segmentation of one or more nominal repetitions of TB(s) into actual repetitions of the TB(s) is referred to as segmentation. For UE-initiated COT in CG or DG, if any of the UL transmissions of single TB or repetitions of TB(s) is conflicted with an idle period of a UE's FFP or an idle period of a gNB's FFP, at least one of the following strategies can be adopted:
If the location of uplink resource collides with the idle period of UE's FFP, the UE 10 may perform one or more of the following procedures:
The UE 10 skip the transmission of the whole transport block (TB) as long as the TB is overlapped in part with the idle period.
The UE 10 treats symbols in idle periods as invalid symbols and performs segmentation by dividing nominal repetition of the TB into actual repetitions of the TB based on the similar scheme in type 2 repetition of Rel. 16 URLLC.
If the location of uplink resources collides with the idle period of the gNB's FFP, the UE 10 may perform one or more of the following procedures:
The UE 10 can still perform UL transmission the TB or repetitions of the TB over the idle period.
The UE 10 skips the UL transmission as long as it is overlapped in part with the idle period.
The UE 10 regards symbols in idle periods as invalid symbols and performs segmentation by dividing nominal repetition of the TB into actual repetitions of the TB based on the similar scheme in type 2 repetition of Rel. 16 URLLC.
In an embodiment, the gNB 20 transmits a gNB-controlled indication to the UE 10. Based on gNB controlled indication, the UE 10 determines UE's behavior regarding whether to perform UL transmission over an idle period of a gNB's FFP. The gNB-controlled indication may include one or more of the following:
Dynamic unicast or group common indication;
RRC configuration;
Medium access control (MAC) control element (CE); and
A predetermined rule.

For example, the predetermined rule may comprise a default setting, whereby the UE 10 determines UE's behavior regarding whether to perform UL transmission over an idle period of a gNB's FFP according to the default setting. The predetermined rule can be subject to be overwritten. In another example, the predetermined rule may comprise priority level information relevant to a specific traffic the UE 10 obtains from higher layer signaling.

Embodiment 5-2: Sharing gNB-Initiated COT for UL Transmission Overlapping with an Idle Period For the UE 10 sharing a gNB-initiated COT in CG or DG, if any of the UL transmissions of single TB or repetitions of TB(s) is conflicted with an idle period of a UE's FFP or an idle period of an gNB's FFP, at least one of the following strategies can be adopted:
If the location of an uplink resource collides with an idle period of UE's FFP, the UE 10 may ignore the idle period and still perform the UL transmissions of single TB or repetitions of TB(s) over the idle period.
If the uplink resources for the UL transmission collides with an idle period of the gNB's FFP, the UE 10 may perform one or more of the following procedures:

The UE 10 skip the transmission of the whole transport block (TB) as long as the TB is overlapped in part with the idle period.

The UE 10 treats symbols in idle periods as invalid symbols and performs segmentation by dividing nominal repetition of the TB into actual repetitions of the TB based on the similar scheme in type 2 repetition of Rel. 16 URLLC.

In an embodiment, the gNB 20 transmits a gNB-controlled indication to the UE 10. Based on gNB controlled indication, the UE 10 determines UE's behavior regarding whether to perform UL transmission over an idle period of a gNB's FFP. The gNB-controlled indication may include one or more of the following:

Dynamic unicast or group common indication;

RRC configuration;

Medium access control (MAC) control element (CE); and

A predetermined rule.

For example, the predetermined rule may comprise a default setting, whereby the UE 10 determines UE's behavior regarding whether to perform UL transmission over an idle period of a gNB's FFP according to the default setting. The predetermined rule can be subject to be overwritten. In another example, the predetermined rule may comprise priority level information relevant to a specific traffic the UE 10 obtains from higher layer signaling.

Embodiment 5-2-1: An Example of a Procedure for Uplink Transmission Overlapping with an Idle Period An idle period in a UE's FFP is referred to as a UE's idle period, and an idle period in an gNB's FFP is referred to as a gNB's idle period.

Figure 9:
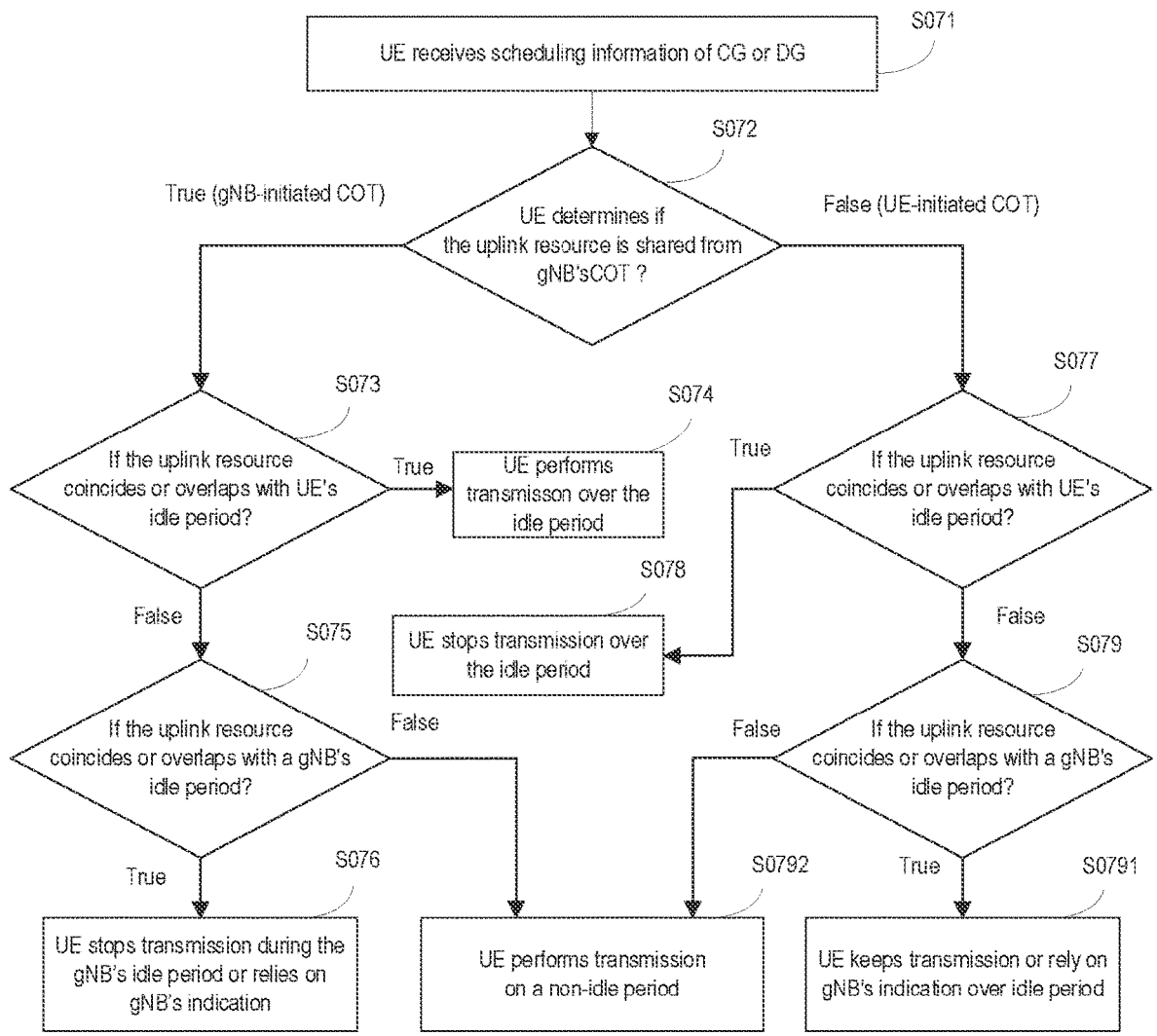
FIG. 9 illustrates a schematic view showing an example of a procedure for uplink transmission overlapping with an idle period.

With reference to FIG. 9, the UE 10 receives scheduling information of a CG or DG uplink resource (S071) and determines if the uplink resource is shared from a gNB-initiated resource (e.g., a gNB-initiated COT) or a UE-initiated resource (e.g., a UE-initiated COT) (S072). The gNB-initiated resource may comprise a gNB-initiated COT, and the UE-initiated resource may comprise a UE-initiated COT.

If the uplink resource is shared from a gNB-initiated COT, the UE 10 determines if a location of the uplink resource coincides or overlaps with a UE's idle period (S073). A UE's idle period is an idle period in a UE's FFP, and a gNB's idle period is an idle period in a gNB's FFP. If the location of the uplink resource coincides or overlaps with a UE's idle period, the UE 10 can still perform UL transmission over the idle period (S074). If the location of the uplink resource does not coincide or overlap with a UE's idle period, the UE 10 determines if the location of the uplink resource coincides or overlaps with a gNB's idle period (S075). If the location of the uplink resource coincides or overlaps with a gNB's idle period, the UE 10 stops the transmission during the gNB's idle period or relies on gNB's indication (S076) to determine UE's behavior regarding whether to perform UL transmission over an idle period of a gNB's FFP. If the location of the uplink resource does not coincide or overlap with a gNB's idle period, the UE 10 can still perform UL transmission over the uplink resource which may be referred to as a non-idle period (S0792).

If the uplink resource is a UE-initiated COT, the UE 10 determines if the location of the uplink resource coincides or overlaps with a UE's idle period (S077). If the location of the uplink resource coincides or overlaps with a UE's idle period, the UE 10 stop the transmission over the UE's idle period (S078).

If the location of the uplink resource does not coincide or overlap with a UE's idle period, the UE 10 determines if the location of the uplink resource coincides or overlaps with a gNB's idle period (S079). If the location of the uplink resource coincides or overlaps with a gNB's idle period, the UE 10 can still perform UL transmission over the gNB's idle period, or relies on gNB's indication to determine UE's behavior regarding whether to perform UL transmission over an idle period of a gNB's FFP (S0791). If the location of the uplink resource does not coincide or overlap with a gNB's idle period, the UE 10 can still perform UL transmission over the uplink resource which may be referred to as a non-idle period (S0792).

Embodiment 6: Indication of Using UE-Initiated COT of One of the Other UEs for DL Transmission by gNB

Embodiment 6-1: Indication Scheme of Using UE-Initiated COT of One of the Other UEs for DL Transmission by gNB The gNB 20 may send to the UE 10 an indication about whether a COT is shared from one of the other UEs or is originated from the gNB 20 using the following schemes.

Explicit indication in unicast or group-common DCI:

The gNB 20 may carry the indication as an explicit indication in unicast DCI or a group-common DCI to the UE 10. Indication of whether the COT is shared from one of the other UEs or is originated from the gNB 20 can be jointly encoded with an indication of whether the COT is a UE-initiated COT activated for the current UE.

The bit field indicating that the COT is a UE-initiated COT of one of the other UEs or a gNB-initiated COT can be the following:

Reusing existing field for indication of an LBT type for LBE.

Using a specifically defined field, other than existing fields in the DCI.

Using any combination of more than one field with a specific code point.

Using a non-used field for FBE, which is borrowed from the LBE case.

Can jointly encode with another bit field.

Implicit indication

The gNB 20 may carry the indication in form of an implicit indication to the UE 10. For example, the indication may be revealed by a location of a DL channel/signal transmitted from the gNB 20 to the UE 10. The UE 10 can determine whether the COT is shared from one of the other UEs or initiated by the gNB 20 based on the location of a DL channel/signal received by the UE 10. For example, if the UE 10 detects a DL channel/signal is at the beginning of a gNB's COT, the UE 10 determines that the COT is initiated by the gNB 20. Otherwise, the UE 10 determines that the COT is shared from one of the other UEs.

Embodiment 6-2: Transmission Limitation of Using a UE-Initiated COT of One of the Other UEs for DL Transmission by gNB In an embodiment, in the FIG. 2A to FIG. 2C, content of the DL burst is at least intended for the UE initiating the COT, including a broadcast information, a dedicated RRC signaling, a DCI with scheduling information, or a DCI without scheduling information.

During a COT shared from one of the other UEs, the gNB 20 may have some limitations on DL channel/signal type(s) that can be transmitted by the gNB 20. The gNB 20 can transmit DL channels or signals of one or more DL channel/signal types that are not restricted by the limitations and cannot transmit DL channels or signals of other DL channel/signal types that are restricted by the limitations.

Applicability of DL channel/signal type transmitted by the gNB 20, if the COT is shared from one of the other UEs, can be configured by the gNB 20 based on features of DL channel/signal types. A DL channel/signal can be categorized into one of DL channel/signal types including:
- Broadcast information, i.e., SSB;
- Broadcast RRC signaling, i.e., SIB1;
- Dedicated RRC signaling;
- Group common DCI, e.g., DCI format 2_0, with corresponding PDSCH(s); and
- Unicast DCI with corresponding PDSCH(s).

In an embodiment, only part of DL channel/signal types is eligible for being transmitted by the gNB 20 if the COT is shared from one of the other UEs. The UE 10 does not need to monitor DL channel/signal of the DL channel/signal type if the DL channel/signal type is not allowed to be transmitted in the shared COT of one of the other UEs.

Figure 10:
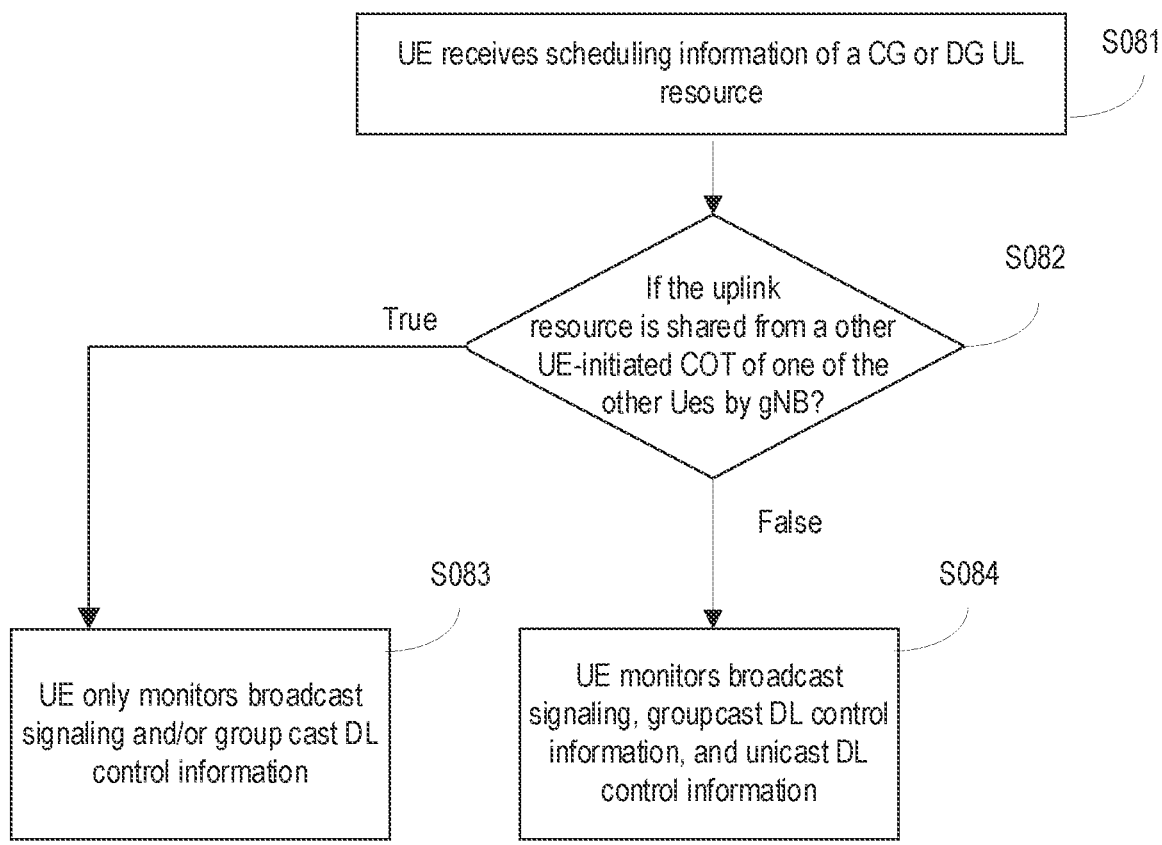
FIG. 10 illustrates a schematic view showing an example of a procedure for DL transmission using a UE-initiated COT of one of the other UEs.

Embodiment 6-2-1: An Example of a Procedure of Using a UE-Initiated COT of One of the Other UEs for DL Transmission by gNB With reference to FIG. 10, the UE 10 receives scheduling information of a CG or DG uplink resource (S081).

The UE 10 determines whether the uplink resource is shared from a UE-initiated COT of one of the other UEs based on an implicit or explicit indication sent from the gNB 20 (S082).

If the uplink resource is shared from a UE-initiated COT of one of the other UEs, the UE 10 only monitors broadcast signaling (e.g., broadcast information or broadcast RRC signaling) and/or groupcast DL control information (e.g., group common DCI) (S083).

If the uplink resource is not shared from a UE-initiated COT of one of the other UEs, the UE 10 monitors broadcast signaling, groupcast DL control information, and unicast DL control information (S084).

Embodiment 7: UE-Initiated COT for UL CG

Embodiment 7-1: UE Multiplexing UL Transmission in UE-Initiated COT for UL CG

To support uplink multiplexing via jointly UE-initiated COT, the following schemes can be adopted.
- Same FFP parameters, i.e., a period or an offset, can be configured for a group of UEs including the UE 10.
- More than one LBT sub-bands can be configured for the UE 10 using multiple CG configurations. The UE 10 can select one of the sub-bands for UL transmission based on LBT result(s) and jointly perform UL transmission with other UEs over different sub-bands. In an embodiment, the scheduling information includes more than one CG configuration for UL transmission in the FFP according to the set of FFP parameters associated with the UE.

Embodiment 7-2: Overwriting of COT Type for UL Transmission in CG Resource(s)

An example of criteria based on which the UE 10 determines a COT type may comprise that the UE 10 determines to perform CG resource UL transmission that starts at the beginning of the FFP. If the UE 10 have determined a COT type based on some criteria, the gNB 20 can overwrite the COT type using the following schemes:
- group-common DCI (GC-DCI), for example, comprising:
  - Newly created GC-DCI;
  - Slot format indication (SFI) in DCI format 2_0; or
  - Uplink cancellation (CI) in DCI format 2_4.
- Unicast DCI, for example, comprising:
  - activation DCI The gNB 20 can use a gNB-determined COT type in a GC-DCI or a unicast DCI to overwrite the COT type determined by the UE 10. In an embodiment, the COT-initiator information in the activation DCI overwrites the COT-initiator determination according to a decision rule used for CG UL transmission. The COT-initiator information is located in a group common DCI for indicating a COT-initiator for a group of UEs.

Embodiment 7-3: Sharing of UE-Initiated COT to gNB for DL Transmission in CG Resource To ensure enough shared resources for DL transmission from the gNB 20 in a UE-initiated COT, the gNB 20 may use the following schemes.

The gNB 20 may use a downlink control signal to request or instruct the UE 10. The UE 10 may, in response to the downlink control signal, reduce a repetition number of CG PUSCH or reserve radio resources for the gNB 20 in the UE-initiated COT. The downlink control signal may comprise RRC configuration, unicast DCI, or GC-DCI, which are further detailed in the following:
- RRC configuration, for example, comprising:
  - a resource reservation bitmap.
- unicast DCI, for example, comprising:
  - an activation DCI for type 2 repetition.
- group-common DCI (GC-DCI), for example, comprising:
  - New created GC-DCI;
  - Slot format indication (SFI) in DCI format 2_0; or
  - Uplink cancellation (CI) in DCI format 2_4.

If the UE 10 does not have UL data to transmit in CG-PUSCH, but still want to share UE-initiated COT of UE 10 to the gNB 20, the UE may operate one of the following schemes:
- The UE 10 can still transmit other uplink channels/signals, e.g., DMRS, SRS, CG-UCI at the beginning of an FFP to trigger UE-initiated COT.
  - The gNB 20 can request the UE 10 to do so via RRC signaling or dynamic DCI.
- The gNB 20 can still access the UE-initiated COT by assuming the UE-initiated COT has been initiated by the UE 10 even if the gNB 20 detects no uplink channel/signal from the UE 10.

In an embodiment, the UE shares the COT initiated by the UE to the base station by transmitting the UL burst at the beginning of the FFP according to the set of FFP parameters associated with the UE.

Embodiment 7-4: Reduce Latency Caused by LBT for CG PUSCH Transmission

The gNB 20 can configure multiple CG configurations with different starting offsets, such that the gap between time-domain resources of two CG configurations can be shorter than 16 us, and type 2 LBT (no LBT) can be applied to reduce latency.

To avoid LBT within the UE-initiated COT due to the gaps between slot boundaries, the UE 10 may use PUSCH repetition type B for cross slot transmission.

Embodiment 7-5: Indication of COT Type in CG-UCI

COT sharing information in CG-UCI can be used to indicate whether the UE 10 has initiated a COT to the gNB 20.

If the UE 10 does not initiate a COT (i.e., the UE 10 uses UL resource(s) shared from gNB's COT), the UE 10 may use the following examples to indicate to the gNB 20 COT sharing information informing "no sharing" of COT:

- Using newly added information bit as a part of COT sharing information and explicitly indicates to the gNB 20 the COT sharing information.
- Using existing COT sharing information with a length of a COT duration set to zero to indicate the gNB 20 that the UE 10 does not initiate a COT.
- Not transmitting any COT sharing information in CG-UCI (i.e., COT sharing information is absent) to indicate to the gNB 20 that the UE 10 does not initiate a COT.

If the UE 10 initiates a COT, the UE 10 uses the existing COT sharing information to indicate that the UE 10 has initiated a COT and provides a COT duration for sharing with the gNB 20.

In an embodiment, the UE requests the base station not to share the COT initiated by the UE using a COT sharing information transmitted in the UL burst. The COT sharing information may be located in a CG-UCI transmitted together with the UL burst.

Embodiment 8: Features of CG for URLLC UL Transmission in an Unlicensed Band within a Controlled Environment

Embodiment 8-1: Selection Between URLLC CG Mechanism and NR-U CG Mechanism

The gNB 20 can decide to use either URLLC CG mechanism or NR-U CG mechanism, including corresponding repetition schemes, in an unlicensed band. The gNB 20 and one or more UE (e.g., the UE 10) may synchronize the mechanism used by the gNB 20 according to predetermined rules. The gNB 20 may use a downlink control signal to notify one or more UE (e.g., the UE 10) of a mechanism used by the gNB 20. The downlink control signal may comprise dynamic unicast, group common DCI indication, RRC configuration, or MAC CE. The gNB 20 may use the following schemes to indicate to one or more UE (e.g., the UE 10) the mechanism used by the gNB 20:

Dynamic unicast or group common DCI indication.
RRC configuration:
  The gNB 20 may use a new RRC parameter to explicitly indicate to one or more UE (e.g., the UE 10) the mechanism used by the gNB 20 for CG PUSCH transmission.
  The gNB 20 may use an existing RRC parameter, which is relevant to the use case or traffic type, or priority for implicit indicating the mechanism selected by the gNB 20 for CG PUSCH transmission.

MAC CE.
Predetermined rule:
  For example, the gNB 20 and one or more UE (e.g., the UE 10) may use a default setting based on a certain rule(s), which can be subject to be overwritten.

Embodiment 8-2: Combination of Features from URLLC CG Mechanism and NR-U CG Mechanism

Embodiment 8-2-1: Feature Combination Variation 1 (Multiple TBs)

The feature of a single transport block (TB) or multiple TBs transmission per period in NR-U CG can be supported in URLLC CG, with the following possible variations.

Determination of HARQ process ID of each TB per CG configuration or HARQ process IDs of each TB for each of multiple CG configurations can be configured by the gNB 20 using the following Scheme1 or Scheme2.

Scheme1:
  The number of HARQ Process ID can be derived from at least one of the following parameters:
    a location of the first symbol in UL transmission of a TB;
    a number of CG configurations; and
    a number of TBs
  RV decision for each repetition of a TB and the location of the initial transmission among repetitions can reuse URLLC CG schemes.
  NDI can be transmitted in CG-UCI if the function of autonomous retransmission is configured.

Scheme 2:
  The UE 10 can select an HARQ process ID from configured multiple HARQ process IDs for each TB.
  The UE 10 can determine RV for each repetition of a TB and the location of the initial transmission among repetitions based on the following schemes:
    The UE 10 uses a gNB 20 pre-configured RV sequence once the location of the initial transmission among repetitions has been determined by the UE 10.
    The UE 10 determines an RV value and reports the RV value in CG-UCI.

Embodiment 8-2-2: Feature Combination Variation 2 (CG-UCI)

The feature of CG-UCI in NR-U can be supported in URLLC CG in an unlicensed band. The gNB 20 may configure the presence or absence of a CG-UCI in the PUSCH, and configure contents of CG-UCI using a newly defined parameter or existing CG relevant parameters. The following are possible CG-UCI configurations:

CG-UCI is preset or absent.
CG-UCI can include only COT sharing information.
CG-UCI can include only autonomous retransmission related information, i.e., an HARQ process ID, RV, and NDI.
CG-UCI can include full or part of the following information: COT sharing information, HARQ process ID, RV, and NDI.

The UE 10 may enhance transmission reliability of CG-UCI using the following schemes:
  The UE 10 transmits CG-UCI in each actual repetition of CG-PUSCH.
  The value of a beta offset for UCI multiplexed with the PUSCH resource can be enhanced to ensure CG-UCI reliability. The beta offset has been defined in the 3GPP standards.

Embodiment 8-2-3: Feature Combination Variation 3 (CG-DFI)

The feature of CG-DFI in NR-U can be supported in URLLC CG under an unlicensed band. The gNB 20 may configure whether CG downlink feedback information (CG-DFI) is included in DCI, and configure the function(s) supported in CG-DFI. The following are possible CG-DFI configurations:
  For multiple TBs transmitted according to multiple activated CG configurations, DFI indication in DCI for each of the HARQ process IDs for multiple TBs can be organized in the following schemes. One HARQ process IDs is associated with one of the multiple TBs.
    The gNB 20 uses a 2-D bitmap as a DFI indication, where one dimension of the 2-D bitmap represents index(es) of activated CG configuration(s), and the other dimension of the 2-D bitmap represents HARQ process IDs for every TBs.
    The gNB 20 uses 1-D bitmap as a DFI indication to concatenate HARQ process IDs of TBs in each activated CG configuration.
    The gNB 20 uses additional fields or existing bit fields in DCI to indicate a CG configuration selected by the gNB 20, and the DFI indication and bitmap (e.g., the 2-D bitmap or the 1-D bitmap) used in NR-U only indicate HARQ process ID(s) of corresponding CG configuration.
  In addition to DCI format 0_1, DFI indication and one of the aforementioned bitmaps for HARQ process ID are also supported in DCI format 0_2 in URLLC CG in an embodiment of the disclosure.
    The gNB 20 uses a new field to carry and transmit CG-DFI in DCI format 0_2 to the UE 10.
  The gNB 20 can configure that a CG-DFI is included in the DCI without cg-RetransmissionTimer being configured.
  CG-DFI can be transmitted by the gNB 20 in DCI using COT shared from the UE 10.

Embodiment 8-2-4: Feature Combination Variation 4 (Repetition for Multiple TBs)

The features of transmitting multiple TBs in NR-U can be supported in URLLC DG or CG for Type A or Type B repetition in an unlicensed band. The following are possible configurations.
  Shared repetition pattern for multiple TBs:
    Reusing URLLC TDRA table in Rel. 16 for CG Type 1 or Type 2 and DG, the gNB 20 may configure one of the following repetition schemes for multiple TBs where multiple TBs share the same repetition patterns:
      Scheme 1: The UE 10 transmits multiple TBs as a first group and one or more group repetitions of the first group following the first group.
        The row of indexed SLIV in the TDRA table indicates the location of the first TB, and the locations of other TBs are orderly arranged sequentially following the first TB. After all the TBs have been transmitted, the group of TBs are repeatedly transmitted as the group repetitions until a repetition number of group repetitions is achieved.
      Scheme 2: The UE 10 transmits a single repetition of a TB as a first repetition and a repetition of a next TB following the first repetition:
        The row indexed SLIV in the TDRA table indicates the location of first TB, and repetition of the first TB is conducted firstly according to a repetition number, followed by the next TB, whose location can be implicitly determined based on the location of previous TB(s) and the repetition number.
    The Same frequency hopping rules as Rel. 16 URLLC can be adopted for repetition of multiple TBs.
  Independent repetition pattern for multiple TBs:
    Extending or enhancing the TDRA table in Rel. 16 URLLC for CG Type 1 or Type 2 and DG to accommodate more than one set of SLIVs and repetition numbers in a row.
    The UE 10 uses a row index in RRC signaling or DCI to select a set of SLIVs and repetition numbers for mapping to each of multiple TBs. The SLIV and repetition number can be indicated independently for each TB.
    Different frequency hopping patterns can be configured independently for each TB.

Embodiment 8-2-5: Feature Combination Variation 5 (Autonomous Retransmission)

The feature of autonomous retransmission in NR-U CG can be supported by URLLC CG in an unlicensed band. Following are possible configurations of URLLC CG.
  The UE 10 uses the cg-RetransmissionTimer in NR-U CG for URLLC CG.
  The UE 10 transmits HARQ process ID, RV, and NDI in CG-UCI for URLLC CG.

Embodiment 8-2-6: Feature Combination Variation 6 (Type a or Type B Repetition)

The features of Type A or Type B repetition in URLLC CG can be adopted in NR-U to support multiple TBs transmission. The UE 10 may perform UL transmission using the following are possible configurations:
  For Type A repetition,
    A parameter of a number of consecutive slots in a CG period (cg-nrofSlots) in NR-U can be used as the maximum number of total repetitions for multiple TBs.
    A repetition parameter of each TB can be provided using a row index of the TDRA table by RRC configuration for Type-1 CG or by activation DCI for Type-2 CG.
    A parameter of a number of PUSCH(s) within a slot (nrofPUSCH-InSlot) in NR-U can be configured to 1 to be in consistent with URLLC CG Type A repetition in Rel. 16.
  For Type B repetition,
    Intra and inter slot repetitions crossing slot boundary and/or crossing one or more invalid symbols can be adopted in NR-U CG.

A parameter of a number of consecutive slots in a CG period (cg-nrofSlots) in NR-U determines the maximum number of total repetitions for multiple TBs.

With a configured symbol length for each repetition in SLIV. If the length of cg-nrofSlots cannot accommodate integer multiple of repetitions, the last repetition which include symbols less than full symbol length can be skipped or truncated to remaining symbols to fit the total length of cg-nrofSlots.

The TDRA parameter, including SLIV for initial transmission and repetition number K for each TB can be provided using row index by RRC configuration for Type-1 CG or by activation DCI for Type-2 CG. However, the total number of repetitions is restricted by cg-nrofSlots.

A parameter of a number of PUSCH(s) within a slot (nrofPUSCH-InSlot) in NR-U is not used or can be used to restrict the number of repetitions within a slot.

A repetition pattern of Type B repetition can be determined by repetition number K, cg-nrofSlots, and nrofPUSCH-InSlot.

For FBE with UE-initiated COT, the UE 10 can perform cross-FFP repetitions based on Type B repetition by treating symbols in an idle period of a UE's FFP as invalid symbols.

Embodiment 9: CG-PUSCH Repetition Overlapped with a Semi-Static Flexible Symbol

To avoid LBT during transmission of non-continuous repetitions over semi-static flexible symbols. If dynamic SFI is configured but the UE 10 does not receive or detect SFI in DCI format 2_0, and at least one symbol of a repetition of a TB to be transmitted from the UE 10 conflicts with a semi-static flexible symbol. Whether the repetition is transmitted or not can be determined based on the following schemes.

RRC configuration:
The gNB 20 can configure the UE 10 using RRC configuration as to whether the UE 10 shall transmit or not transmit CG-PUSCH or repetition(s) of CG-PUSCH over semi-static flexible symbols based on a newly created dedicated parameter or existing CG related parameters in the RRC configuration, which includes priority level information.

Predetermined rule:
If the gNB 20 selects the NR-U CG mechanism as a CG PUSCH transmission scheme, whether the UE 10 shall transmit CG-PUSCH or repetition(s) of CG-PUSCH over semi-static flexible symbols follows one or more predetermined CG PUSCH rules. For example, the UE 10 can transmit CG-PUSCH or repetition(s) of CG-PUSCH over semi-static flexible symbols when a CG PUSCH rule is satisfied. Otherwise, the UE 10 is not allowed to transmit CG-PUSCH or repetition(s) of CG-PUSCH over a semi-static flexible symbol.

Embodiment 10: Orphan Symbol Due to Segmentation Across Slot Boundary

In URLLC CG of Rel. 16, when only one symbol (i.e., orphan symbol) is left within a slot after segmentation of Type B repetition, the UE 10 skip repetition transmission at this symbol.

For PUSCH Type B repetition crossing a slot boundary, if the segmentation creates an orphan symbol, the UE 10 can use the following strategies to avoid transmission gap caused by the orphan symbol.

Whether the UE 10 shall perform uplink transmission during the orphan symbol or not can be indicated by the gNB 20 using RRC signaling, dynamic DCI, a predetermined rule, or CG relevant RRC configuration, which is detailed in the following:

RRC signaling: The gNB 20 may use RRC signaling to configure and indicate that the UE 10 can perform UL transmission during the orphan symbol.

Dynamic DCI: The gNB 20 may use dynamic DCI to configure and indicate that the UE 10 can perform UL transmission during the orphan symbol.

Implicitly determined based on a predetermined rule: The gNB 20 and the UE 10 may use a predetermined rule to determine whether the UE 10 can perform UL transmission during the orphan symbol. For example, the predetermined rule can be related to a time duration for LBT or the length of the gap.

Relies on CG relevant RRC configuration which includes priority level information: The gNB 20 and the UE 10 may use a RRC configuration with priority level information to determine whether the UE 10 can perform UL transmission during the orphan symbol. The priority level information may comprise priority level of different types of traffic or services with different requirements, such as latency requirements. For example, for a type of traffic with a higher priority level traffic or a stricter latency requirement, the UE 10 shall transmit the type of traffic during the orphan symbol.

If the UE 10 performs UL transmission during the orphan symbol, the UE 10 can transmit one of the following:
DMRS.
Actual scheduled repetition located in the orphan symbol after performing rate matching over DMRS resources.

Figure 11:
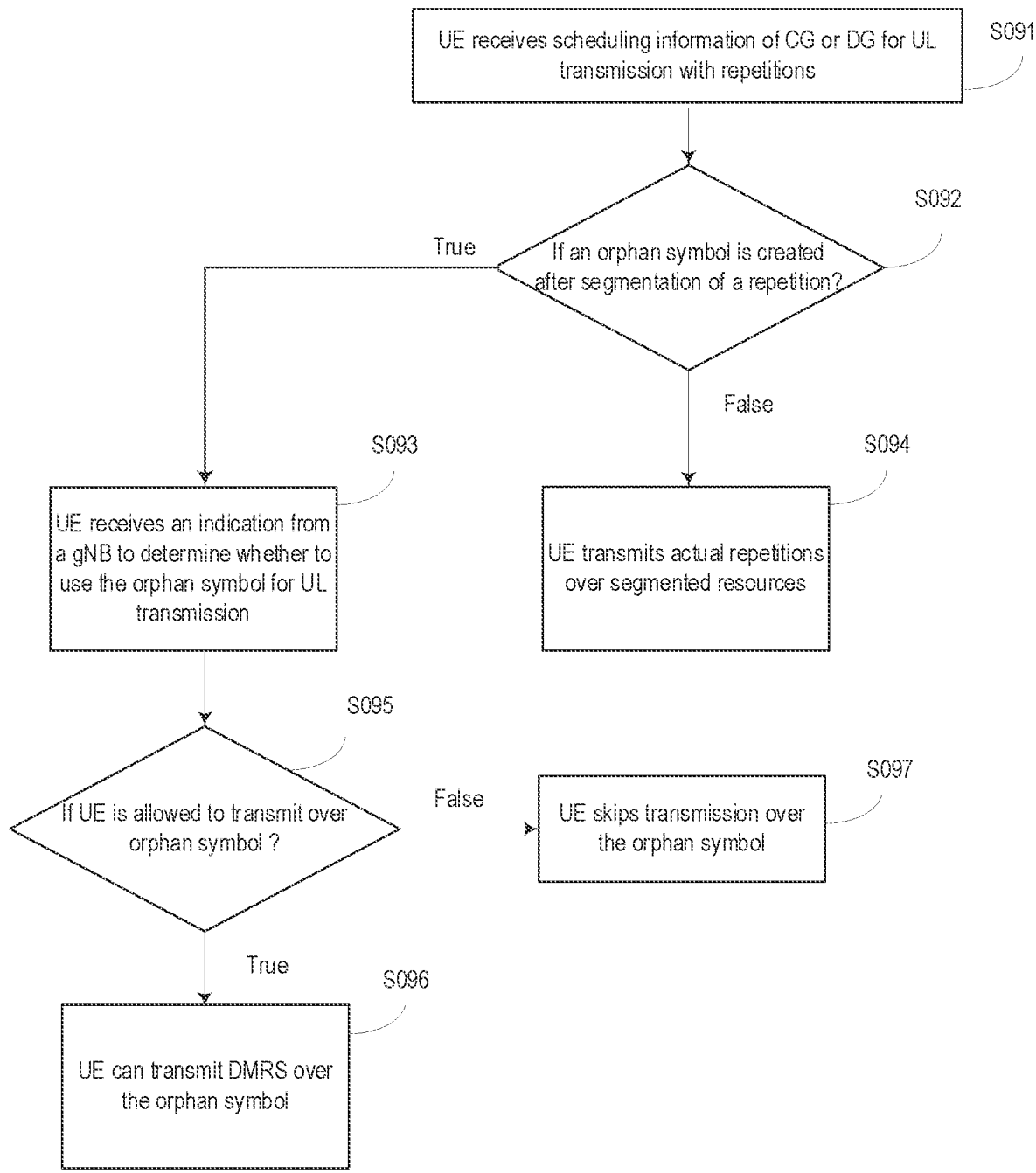
FIG. 11 illustrates a schematic view showing an example of a UL transmission procedure with an orphan symbol caused by segmentation across slot boundary.

Embodiment 10-1: An Example of a UL Transmission Procedure with an Orphan Symbol Caused by Segmentation Across Slot Boundary With reference to FIG. 11, the UE 10 receives scheduling information of CG or DG for uplink transmission with repetitions (S091).

The UE 10 determines if a repetition of the repetitions crosses a slot boundary and determines whether an orphan symbol is created after segmentation of the repetition (S092).

If a repetition crosses a slot boundary and an orphan symbol is created after segmentation of the repetition, the UE 10 receives an indication from the gNB 20 (S093) and determines whether the UE 10 is allowed to use the orphan symbol for UL transmission in response to the indication (S095). Otherwise, the UE 10 transmits actual repetitions over segmented resources (S094).

If the UE 10 performing UL transmission over an orphan symbol is allowed based on the indication from the gNB 20 (S095), the UE 10 can transmit uplink data or signal (e.g., DMRS) over the orphan symbol t (S096). Otherwise, the UE 10 skips UL transmission over the orphan symbol (S097).

Embodiment 11: CG-PUSCH Repetition Across Invalid

For Type B repetition crossing one or more invalid symbols (e.g., an idle period), after one or more nominal repetitions has been segmented into actual repetitions, a gap is created immediately after the end of one or more invalid symbols. The UE 10 may perform LBT during the gap before transmitting the actual repetition. The gap for LBT may be referred to as an LBT gap and can be created based on the following schemes.

In an embodiment, a nominal repetition is segmented into a first actual repetition located before the idle period and a second actual repetition located after the idle period, a LBT gap is located after the end of the idle period, and the UE to perform LBT sensing during the LBT gap before transmitting the second actual repetition.

In an embodiment, the length of the LBT gap is predefined depending on a channel access type of LBT.

In an embodiment, the length of the LBT gap is configured by the gNB 20 via RRC signaling.

Figure 12:
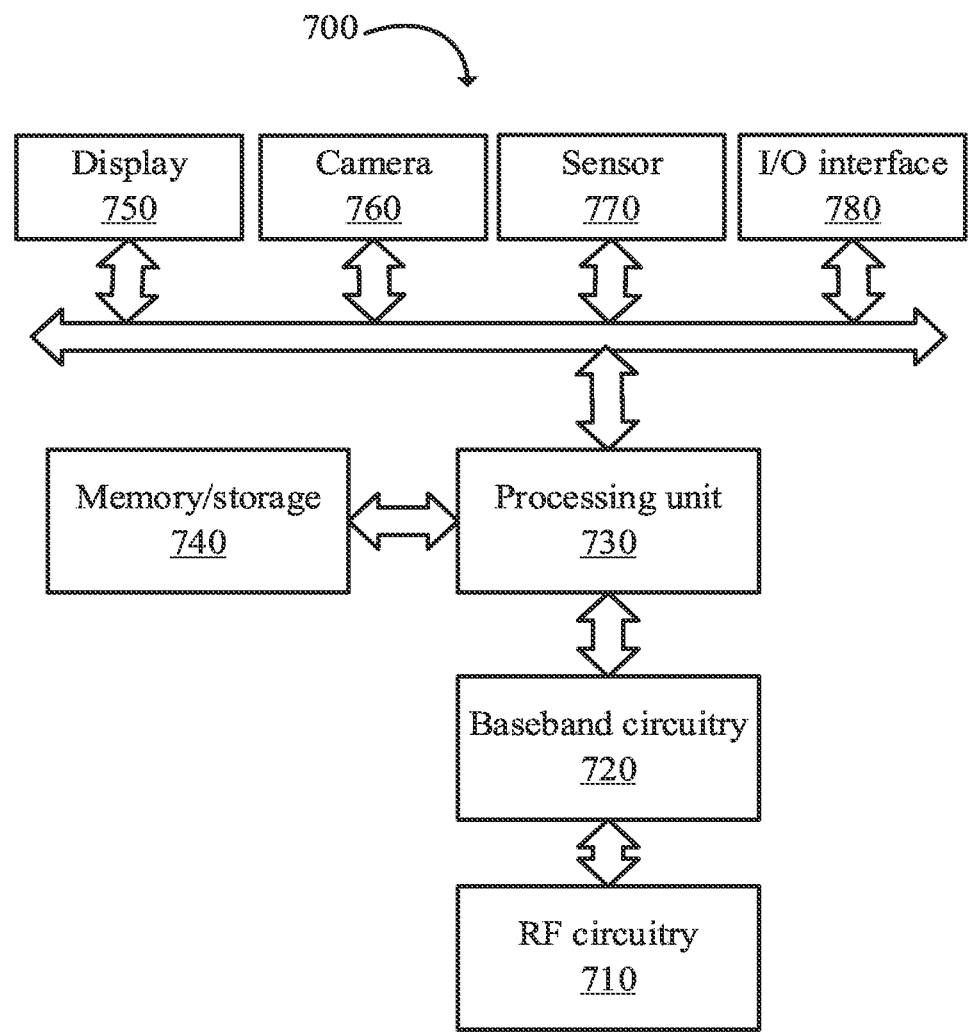
FIG. 12 illustrates a schematic view showing a system for wireless communication according to an embodiment of the present disclosure.

Embodiment 12: Any Schemes, Options, and Examples in Each of the Embodiments, Either for UE-Initiated COT Configuration or for Harmonization Features in NR-U CG or URLLC DG, can be Adopted to Work Together Using Various Combinations for Different Purposes FIG. 12 is a block diagram of an example system 700 for wireless communication according to an embodiment of the present disclosure. Embodiments described herein may be implemented into the system using any suitably configured hardware and/or software. FIG. 12 illustrates the system 700 including a radio frequency (RF) circuitry 710, a baseband circuitry 720, a processing unit 730, a memory/storage 740, a display 750, a camera 760, a sensor 770, and an input/output (I/O) interface 780, coupled with each other as illustrated.

The processing unit 730 may include circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The baseband circuitry 720 may include circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with 5G NR, LTE, an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry. In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the UE, eNB, or gNB may be embodied in whole or in part in one or more of the RF circuitries, the baseband circuitry, and/or the processing unit. As used herein, "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the processing unit, and/or the memory/storage may be implemented together on a system on a chip (SOC).

The memory/storage 740 may be used to load and store data and/or instructions, for example, for the system. The memory/storage for one embodiment may include any combination of suitable volatile memory, such as dynamic random access memory (DRAM)), and/or non-volatile memory, such as flash memory. In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite. In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, the system may have more or less components, and/or different architectures. Where appropriate, the methods described herein may be implemented as a computer program. The computer program may be stored on a storage medium, such as a non-transitory storage medium.

The embodiment of the present disclosure is a combination of techniques/processes that may be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of the application and design requirement for a technical plan. A person having ordinary skill in the art may use different ways to realize the function for each specific application while such realizations should not go beyond the scope of the present disclosure. It is understood by a person having ordinary skill in the art that he/she may refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure may be realized in other ways. The above-mentioned embodiments are exemplary only. The division of the units is merely based on logical functions while other divisions exist in realization. It is possible that a plurality of units or components are combined or integrated into another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments may be integrated into one processing unit, physically independent, or integrated into one processing unit with two or more than two units.

If the software function unit is realized and used and sold as a product, it may be stored in a readable storage medium in a computer. Based on this understanding, the technical plan proposed by the present disclosure may be essentially or partially realized as the form of a software product. Or, one part of the technical plan beneficial to the conventional technology may be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

A user equipment (UE) executes a semi-static channel access method during a random access procedure in an unlicensed band. A base station transmits configuration information and downlink (DL) information to the UE in a fixed frame period (FFP) according to a set of FFP parameters associated with the base station. The UE determines whether to initiate a channel occupancy time (COT) in an FFP according to a set of FFP parameters associated with the UE based on one or more of: at least one condition in the configuration information, at least one condition in scheduling information, at least one condition in DL information, and a detection result of detecting transmission of the DL information. The base station determines whether to use the UE-initiated COT shared from the UE.

Some embodiments of disclosure can be applied to URLLC and Industry IoT to address issues in unlicensed band. FBE supporting UE-initiated COT is crucial to improve uplink reliability and reduce latency for IIOT/URLLC applications, power consumption, and unnecessary overhead for both the UE and the gNB. Some embodiments of the disclosure provide supports for UE-initiated COT(s). UE-initiated COT for FBE allows a UE to transmit at the earliest time in an FFP without detecting DL channels/signals from a gNB.

If both gNB-initiated COT and UE-initiated COT are activated, the UE can have more UL transmission flexibility and opportunities in a COT of either gNB-initiated FFP or UE-initiated FFP.

For various channel conditions, some embodiments of the disclosure provide supports for configurable harmonization of features and advantages between NR-U CG and URLLC CG. By harmonizing the features of NR-U and URLLC, a UE and a base station, according to some embodiments of the disclosure, can realize latency reduction and reliability enhancement for CG-PUSCH transmission in an unlicensed spectrum.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

The invention claimed is:

1. A channel access method in unlicensed band for execution by a user equipment (UE), comprising:
receiving configuration information and scheduling information from a base station;
detecting transmission of downlink (DL) information in a fixed frame period (FFP) according to a set of FFP parameters associated with the base station;
determining whether to initiate a channel occupancy time (COT) in an FFP according to a set of FFP parameters associated with the UE based on at least one condition in the configuration information, at least one condition in the scheduling information, and a detection result of detecting the transmission of the DL information;
initiating the COT in the FFP according to the set of FFP parameters associated with the UE after a successful listen-before-talk (LBT) upon affirming the determining as to whether to initiate the COT;
transmitting a UL burst in one or more symbols that are valid in a region of the FFP according to the set of FFP parameters associated with the UE; and
receiving a DL burst from the base station in one or more symbols that are valid in the region of the FFP according to the set of FFP parameters associated with the UE when the UE shares with the base station the COT initiated by the UE.

2. The channel access method of claim 1, wherein the configuration information is transmitted in an SIB1 or dedicated RRC signaling, and the configuration information includes at least one set of FFP parameters associated with the UE for performing COT initiation.

3. The channel access method of claim 2, wherein each set of the at least one set of FFP parameters includes an FFP periodicity and an FFP offset associated with the UE, and the at least one set of FFP parameters associated with the UE and the FFP parameter associated with the base station are separately configured.

4. The channel access method of claim 3, wherein a value of FFP periodicity associated with the FFP according to the set of FFP parameters associated with the UE is an integer multiple or an integer factor of a value of the FFP periodicity associated with the FFP according to the set of FFP parameters associated with the base station, and the value of FFP periodicity associated with the FFP according to the set of FFP parameters associated with the UE is configured to be one of 1, 2, 2.5, 4, 5 or 10 milliseconds.

5. The channel access method of claim 3, wherein the FFP offset specifies a starting point of the FFP according to the set of FFP parameters associated with the UE, and a value of the FFP offset is configured with respect to a boundary of a radio frame.

6. The channel access method of claim 2, wherein a set of FFP parameters in the at least one set of FFP parameters is configured in SIB1 for the UE operating in an RRC_IDLE state, and another set of FFP parameters in the at least one set of FFP parameters is configured in dedicated RRC signaling for the UE operating in an RRC_CONNECTED state.

7. The channel access method of claim 2, wherein the UE is provided with options or indicated by the base station to switch from a first set of FFP parameters to a second set of FFP parameters if more than one set of FFP parameters are configured by the base station, and the UE switches to the second set of FFP parameters after the UE has adopted the first set of FFP parameters to perform semi-static channel access for at least 200 milliseconds.

8. The channel access method of claim 2, wherein the UE is configured with a set of FFP parameters based on a row index of a corresponding FFP parameter mapping table configured by the base station.

9. The channel access method of claim 1, wherein the configuration information includes an implicit indication showing that the UE is allowed to perform a UE-initiated COT function.

10. The channel access method of claim 1, wherein the scheduling information is transmitted in RRC signaling and includes a UL resource location for configured grant UL transmission.

11. The channel access method of claim 10, wherein the scheduling information includes more than one CG configuration for UL transmission in the FFP according to the set of FFP parameters associated with the UE.

12. The channel access method of claim 1, wherein the DL information is represented by a transmission of a DL channel or a DL signal transmitted at a starting point of the FFP according to a set of FFP parameters associated with the base station.

13. The channel access method of claim 1,
wherein the at least one condition in the configuration information comprises: the configuration information comprises at least one set of FFP parameters associated with the UE or an indication showing that a UE-initiated COT function is allowed;
wherein the at least one condition in the scheduling information comprises: the scheduling information includes UL resource location information for configured grant UL transmission in the UL burst, the UL resource location information indicates a location of a UL resource for the configured grant UL transmission, a starting location of the UL resource for the configured grant UL transmission is aligned with a starting point of the FFP according to the set of FFP parameters associated with the UE, wherein the UL resource for the configured grant UL transmission in the scheduling information is located within a COT of the FFP according to the set of FFP parameters associated with the base station;
wherein the detection result of detecting the transmission of the DL information comprises: the UE does not detect the transmission of DL information from a starting point of the FFP according to the set of FFP parameters associated with the base station.

14. The channel access method of claim 13, wherein the at least one condition in the scheduling information further comprise a condition that the UL resource for the configured grant UL transmission is a valid UL resource for performing COT initiation by the UE.

15. The channel access method of claim 14, wherein the UL resource is a valid UL resource for performing COT initiation by the UE if symbols within the UL resource satisfies at least one of the following conditions:
symbols in the UL resource are not indicated as DL symbols by the base station; and
symbols in the UL resource are not cancelled by the base station.

16. The channel access method of claim 1, wherein the UE is operated in an RRC_CONNECTED state.

17. The channel access method of claim 1, wherein one or more valid symbols for transmission of the UL burst is defined as at least one of the following:
symbols intended for UL transmission are not located within an idle period of the FFP where UE initiates the COT;
symbols intended for UL transmission are not indicated as DL symbols by the base station; and
symbols intended for UL transmission are not cancelled by the base station.

18. The channel access method of claim 17, wherein transmission of the UL burst in the FFP according to the FFP parameter associated with the UE includes repetitions of UL transmission, and when a nominal repetition in the repetitions coincides or overlaps with one or more invalid symbols, the nominal repetition is segmented into actual repetitions based on PUSCH repetition type B, or the nominal repetition is not transmitted.

19. The channel access method of claim 17, wherein a nominal repetition is segmented into a first actual repetition located before the one or more invalid symbols and a second actual repetition located after the one or more invalid symbols, a LBT gap is located after the end of the idle period, and the UE performs LBT sensing during the LBT gap before transmitting the second actual repetition.

20. The channel access method of claim 1, wherein one or more valid symbols for transmission of the DL burst are symbols not located within an idle period of the FFP according to the set of FFP parameters associated with the UE.

21. The channel access method of claim 1, wherein content of the DL burst is intended for the UE initiating the COT, including a broadcast information, a dedicated RRC signaling, a DCI with scheduling information, or a DCI without scheduling information.

22. The channel access method of claim 1, wherein the UE shares the COT initiated by the UE to the base station by transmitting the UL burst at the beginning of the FFP according to the set of FFP parameters associated with the UE.

23. The channel access method of claim 1, wherein the UE indicates to the base station whether the COT initiated by the UE is shared with the base station using a COT sharing information transmitted in the UL burst.

24. The channel access method of claim 23, wherein the COT sharing information is located in a CG-UCI transmitted together with the UL burst.

25. A user equipment (UE) comprising:
a processor configured to call and run a computer program stored in a memory, to cause a device in which the processor is installed to execute the method of claim 1.

26. A chip, comprising:
a processor, configured to call and run a computer program stored in a memory, to cause a device in which the chip is installed to execute the method of claim 1.

27. A non-transitory computer-readable storage medium, in which a computer program is stored, wherein the computer program causes a computer to execute the method of claim 1.

28. A channel access method in an unlicensed band for execution by a base station, comprising:
transmitting configuration information and scheduling information;
transmitting downlink (DL) information in a fixed frame period (FFP) according to a set of FFP parameters associated with the base station;
receiving an uplink (UL) burst in one or more symbols that are valid in a region of a fixed frame period (FFP) according to a set of FFP parameters associated with a user equipment (UE); and
transmitting a DL burst in one or more symbols that are valid in the region of the FFP according to the set of FFP parameters associated with the UE when the base station uses a channel occupation time (COT) initiated by the UE;
wherein a value of FFP periodicity associated with the FFP according to the set of FFP parameters associated with the UE is an integer multiple or an integer factor of a value of FFP periodicity associated with the FFP according to the set of FFP parameters associated with the base station.

29. The channel access method of claim 28, wherein the configuration information is transmitted in an SIB1 or dedicated RRC signaling, and the configuration information includes at least one set of FFP parameters associated with the UE for performing COT initiation.

30. The channel access method of claim 29, wherein each set of the at least one set of FFP parameters includes an FFP periodicity and an FFP offset associated with the UE, and the at least one set of FFP parameters associated with the UE and the FFP parameters associated with the base station are separately configured.

31. The channel access method of claim 28, wherein the value of FFP periodicity associated with the FFP according to the set of FFP parameters associated with the UE is configured to be one of 1, 2, 2.5, 4, 5 or 10 milliseconds.

32. The channel access method of claim 30, wherein the FFP offset specifies a starting point of the FFP according to the set of FFP parameters associated with the UE, and a value of the FFP offset is configured with respect to a boundary of a radio frame.

33. The channel access method of claim 29, wherein a set of FFP parameters in the at least one set of FFP parameters is configured in SIB1 for the UE operating in an RRC_IDLE state, and another set of FFP parameters in the at least one set of FFP parameters is configured in dedicated RRC signaling for the UE operating in an RRC_CONNECTED state.

34. The channel access method of claim 29, wherein the UE is provided with options or indicated by the base station to switch from a first set of FFP parameters to a second set of FFP parameters if more than one set of FFP parameters are configured by the base station, and the UE switches to the second set of FFP parameters after the UE has adopted the first set of FFP parameters to perform semi-static channel access for at least 200 milliseconds.

35. The channel access method of claim 29, wherein the UE is configured with a set of FFP parameters based on a row index of a corresponding FFP parameter mapping table configured by the base station.

36. The channel access method of claim 28, wherein the configuration information includes an implicit indication showing that the UE is allowed to perform a UE-initiated COT function.

37. The channel access method of claim 28, wherein the scheduling information is transmitted in RRC signaling and includes a UL resource location for configured grant UL transmission.

38. The channel access method of claim 37, wherein the scheduling information includes more than one CG configuration for UL transmission in the FFP according to the set of FFP parameters associated with the UE.

39. The channel access method of claim 28, wherein the DL information is represented by a transmission of a DL channel or a DL signal transmitted at a starting point of the FFP according to a set of FFP parameters associated with the base station.

40. The channel access method of claim 28, wherein a channel occupation time (COT) in the FFP according to the set of FFP parameters associated with the UE is determined to be initiated by the UE based on at least one condition in the configuration information, at least one condition in the scheduling information, and a detection result of detecting the transmission of the DL information.

41. The channel access method of claim 40,
wherein the at least one condition in the configuration information comprises: the configuration information comprises at least one set of FFP parameters associated with the UE or an indication showing that a UE-initiated COT function is allowed;
wherein the at least one condition in the scheduling information comprises: the scheduling information includes UL resource location information for configured grant UL transmission in the UL burst, the UL resource location information indicates a location of a UL resource for the configured grant UL transmission, a starting location of the UL resource for the configured grant UL transmission is aligned with a starting point of the FFP according to the set of FFP parameters associated with the UE, wherein the UL resource for the configured grant UL transmission in the scheduling information is located within a COT of the FFP according to the set of FFP parameters associated with the base station;
wherein the detection result of detecting the transmission of the DL information comprises: the UE does not detect transmission of DL information from a starting point of the FFP according to the set of FFP parameters associated with the base station.

42. The channel access method of claim 41, wherein the at least one condition in the scheduling information further comprise a condition that the UL resource for the configured grant UL transmission is a valid UL resource for performing COT initiation by the UE.

43. The channel access method of claim 42, wherein the UL resource is a valid UL resource for performing COT initiation by the UE if symbols within the UL resource satisfies at least one of the following conditions:
- symbols in the UL resource are not indicated as DL symbols by the base station; and
- symbols in the UL resource are not cancelled by the base station.

44. The channel access method of claim 40, wherein the UE is operated in an RRC_CONNECTED state.

45. The channel access method of claim 28, wherein one or more valid symbols for reception of the UL burst is defined as at least one of the following:
- symbols intended for UL reception are not located within an idle period of the FFP where UE initiates the COT;
- symbols intended for UL reception are not indicated as DL symbols by the base station; and
- symbols intended for UL reception are not cancelled by the base station.

46. The channel access method of claim 45, wherein reception of the UL burst in the FFP according to the set of FFP parameters associated with the UE includes repetitions of UL reception, and when a nominal repetition in the repetitions coincides or overlaps with one or more invalid symbols, the nominal repetition is segmented into actual repetitions based on PUSCH repetition type B, or the nominal repetition is not received.

47. The channel access method of claim 45, wherein a nominal repetition is segmented into a first actual repetition located before the idle period and a second actual repetition located after the idle period, a LBT gap is located after the end of the idle period, and the UE performs LBT sensing during the LBT gap before transmitting the second actual repetition.

48. The channel access method of claim 28, wherein one or more valid symbols for transmission of the DL burst are symbols not located within an idle period of the FFP according to the set of FFP parameters associated with the UE.

49. The channel access method of claim 28, wherein content of the DL burst is intended for the UE initiating the COT, including a broadcast information, a dedicated RRC signaling, a DCI with scheduling information, or a DCI without scheduling information.

50. The channel access method of claim 28, wherein the base station recognizes the COT initiated by the UE is shared to and usable by the base station by detecting the UL burst at the beginning of the FFP according to the set of FFP parameters associated with the UE.

51. The channel access method of claim 28, wherein the base station receives a COT sharing information in the UL burst from the UE, wherein the COT sharing information indicates whether the COT initiated by the UE is shared with the base station.

52. The channel access method of claim 51, wherein the COT sharing information is located in a CG-UCI received together with the UL burst.

53. A base station comprising:
- a processor configured to call and run a computer program stored in a memory, to cause a device in which the processor is installed to execute the method of claim 28.

54. A chip, comprising:
- a processor, configured to call and run a computer program stored in a memory, to cause a device in which the chip is installed to execute the method of claim 28.

55. A non-transitory computer-readable storage medium, in which a computer program is stored, wherein the computer program causes a computer to execute the method of claim 28.

* * * * *